United States Patent
Perreault et al.

(10) Patent No.: US 6,169,728 B1
(45) Date of Patent: Jan. 2, 2001

(54) APPARATUS AND METHOD FOR SPECTRUM MANAGEMENT IN A MULTIPOINT COMMUNICATION SYSTEM

(75) Inventors: John A. Perreault, Hopkinton; Dennis J. Picker, Lincoln; Sunil K. Menon, Mansfield, all of MA (US)

(73) Assignee: Motorola Inc., Schaumburg, IL (US)

( * ) Notice: Under 35 U.S.C. 154(b), the term of this patent shall be extended for 0 days.

(21) Appl. No.: 08/929,008

(22) Filed: Sep. 8, 1997

Related U.S. Application Data

(63) Continuation of application No. 08/625,619, filed on Mar. 29, 1996, now abandoned.

(51) Int. Cl.$^7$ .................................................. H04L 12/50
(52) U.S. Cl. ......................... 370/235; 370/253; 370/458; 370/462
(58) Field of Search .................................... 370/229, 230, 370/231, 234, 235, 236, 253, 431, 462, 489; 455/453, 454; 709/105

(56) References Cited

U.S. PATENT DOCUMENTS

| | | | |
|---|---|---|---|
| 5,347,304 | 9/1994 | Moura et al. ........................... 370/12 |
| 5,402,423 | * 3/1995 | Van Kersen et al. ................. 370/462 |
| 5,479,407 | * 12/1995 | Ko et al. ............................... 370/231 |
| 5,491,801 | * 2/1996 | Jain et al. .............................. 370/229 |
| 5,528,589 | * 6/1996 | Nishidai ................................ 370/235 |
| 5,586,121 | 12/1996 | Moura et al. ......................... 370/404 |
| 5,600,797 | * 2/1997 | Marshall ............................... 370/431 |
| 5,754,484 | * 5/1998 | Perreault ......................... 365/230.01 |
| 5,805,586 | * 9/1998 | Perreault et al. ..................... 370/346 |

* cited by examiner

Primary Examiner—Douglas W. Olms
Assistant Examiner—Ken Vanderpuye
(74) Attorney, Agent, or Firm—Joanne N. Pappas; Jeffrey T. Klayman

(57) ABSTRACT

The apparatus (101) and method for spectrum management in a multipoint communication system controls upstream channel usage for secondary stations (110) transmitting information to a primary station (101) and downstream channel usage for secondary stations (110) receiving information from a primary station (101). The preferred apparatus (101) embodiment includes a processor arrangement (120) having a master controller (121) and a plurality of processors (130), with the processor arrangement connected to a channel interface (125). The apparatus (101) and method controls channel load balancing, channel congestion, and channel assignment in a multipoint communication system, and controls upstream channels independently from downstream channels. Factors and parameters utilized in such channel control and allocation include error parameters, channel noise parameters, transmit and receive loading factors, and congestion parameters.

78 Claims, 16 Drawing Sheets

APPARATUS AND METHOD FOR SPECTRUM MANAGEMENT IN A MULTIPOINT COMMUNICATION SYSTEM

This is a continuation of application Ser. No. 08/625.619, filed Mar. 29, 1996 and now abandoned.

FIELD OF THE INVENTION

This invention relates, in general, to data communications and data communications systems and devices and, more specifically, to an apparatus and method for spectrum management in a multipoint communication system.

BACKGROUND OF THE INVENTION

With the advent of multimedia communications, data transmission has become increasingly complex. For example, multimedia communications applications such as real time transmission of digitally encoded video, voice, and other forms of data, may require new forms and systems for data communication and data transmission. One such new communication system is the CableComm™ System currently being developed by Motorola, Inc. In the Cable-Comm™ System, a hybrid optical fiber and coaxial cable is utilized to provide substantial bandwidth over existing cable lines to secondary stations such as individual, subscriber access units, for example, households having new or pre-existing cable television capability. These coaxial cables are further connected to fiber optical cables to a central location having centralized, primary (or "head end") controllers or stations having receiving and transmitting capability. Such primary equipment may be connected to any variety of networks or other information sources, from the Internet, various on line services, telephone networks, to video/movie subscriber service. With the CableComm™ System, digital data may be transmitted both in the downstream direction, from the primary station or controller (connected to a network) to the secondary station of an individual user (subscriber access unit), and in the upstream direction, from the secondary station to the primary station (and to a network).

In the CableComm™ System, downstream data is currently intended to be transmitted using 64 quadrature amplitude modulation ("QAM") at a rate of 30 M bps (megabits per second), at 5 M symbols/second utilizing 6 bits/symbol, over channels having 6 MHz bandwidth in the frequency spectrum of 50–750 MHz. Anticipating asymmetrical requirements with large amounts of data tending to be transmitted in the downstream direction rather than the upstream direction, less capacity is provided for upstream data transmission, using $\pi/4$ differential quadrature phase shift keying ($\pi/4$-DQPSK) modulation in the frequency band from 5–42 MHz with a symbol rate of 384 k symbols/sec with 2 bits/symbol. In addition, the communication system is designed to have a multipoint configuration, i.e., many end users (secondary stations, also referred to as subscriber access units) transmitting upstream to a primary station, with one or more primary stations transmitting downstream to the secondary stations. The communication system is also designed for asynchronous transmission, with users transmitting and receiving packets of encoded data, such as video or text files. In addition, it is also highly likely that transmission may be bursty, with various users receiving or transmitting data at indeterminate intervals over selected channels in response to polling, contention, or other protocols from the primary station, rather than transmitting a more continuous and synchronous stream of information over a dedicated or circuit switched connection.

For such a communication system having a multipoint configuration, with multiple upstream and downstream channels, it is highly desirable to provide for appropriate or optimal spectrum management, providing for load balancing across various transmit and receive channels, channel (or spectrum) allocation under various types of noise or other error conditions, and for channel (or spectrum) allocation under various types of congestion conditions. Prior art in other fields, such as telephone networks and wireless voice networks, have not been concerned with such spectrum management because these issues typically do not arise for such networks. For example, noise conditions may typically be tolerated in a voice (rather than data) environment. Other fields, such as typical wireline data, are not concerned with channel assignment issues. Wireless voice and data fields, moreover, tend to be concerned about overall system capacity and are not concerned about congestion management and load balancing within channels, as those channels are circuit switched, dedicated channels. Accordingly, a need has remained to provide for spectrum management in emerging multipoint communications systems, such as the Cable-Comm™ system, providing for load balancing, channel assignment, and congestion management within the multipoint communication system.

DETAILED DESCRIPTION OF THE INVENTION

Figure 1:
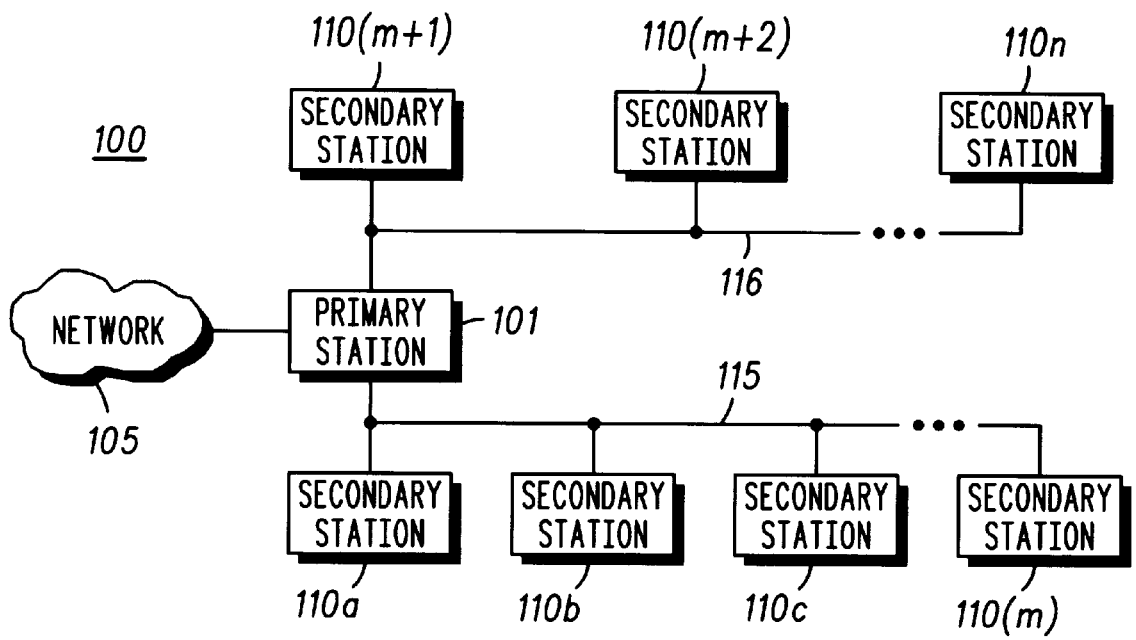
FIG. 1 is a block diagram illustrating a communication system in accordance with the present invention.

As mentioned above, a need has remained to provide for spectrum management in emerging multipoint communications systems, such as the CableComm™ system. Such spectrum management, in accordance with the present invention, includes channel allocation (and assignment) on the basis of error parameters, loading conditions, and congestion management. FIG. 1 is a block diagram illustrating a communication system 100 in accordance with the present invention, such as a multipoint communication system. As illustrated in FIG. 1, a primary station 101, also referred to as a primary transceiver unit 101, is coupled to a plurality of secondary stations $110_a$ through $110_n$, via communication media 115 and 116. In the preferred embodiment, communication media 115 and 116 are hybrid optical fiber and coaxial cable. In other embodiments, the communication media may be coaxial cable, fiber optic cable, twisted pair wires, and so on, and may also include air, atmosphere or space for wireless and satellite communication. The primary station 101 is also coupled to a network 105, which may include networks such as the Internet, on line services, telephone and cable networks, and other communication systems. The secondary stations $110_a$ through $110_n$ are illustrated in FIG. 1 as connected to the primary station 101 on two segments or branches of a communication medium, such as communication media 115 and 116. Equivalently, the secondary stations $110_a$ through $110_n$ may be connected to more than one primary station, and may be connected to a primary station (such as primary station 101) utilizing more or fewer branches, segments or sections of any communication medium.

Continuing to refer to FIG. 1, in the preferred embodiment, the communication medium, such as communication media 115 and 116, has or supports a plurality of communication channels. For ease of reference, the communication channels in which a primary station, such as the primary station 101, transmits information, signals, or other data to a secondary station, such as secondary station $110_n$, are referred to as downstream channels or downstream communication channels. Also for ease of reference, the communication channels in which a secondary station, such as secondary station $110_n$, transmits information, signals, or other data to a primary station, such as primary station 101, are referred to as upstream channels or upstream communication channels. These various upstream and downstream channels may, of course, be the same physical channel or may be separate physical channels, for example, through time division multiplexing or frequency division multiplexing. These various channels may also be logically divided in other ways, in addition to upstream and downstream directions. As mentioned above, in the preferred embodiment of the CableComm™ System, the communication medium is hybrid fiber coaxial cable, with downstream channels in the frequency spectrum of 50–750 MHz, and with upstream channels in the frequency band from 5–42 MHz.

Figure 2:
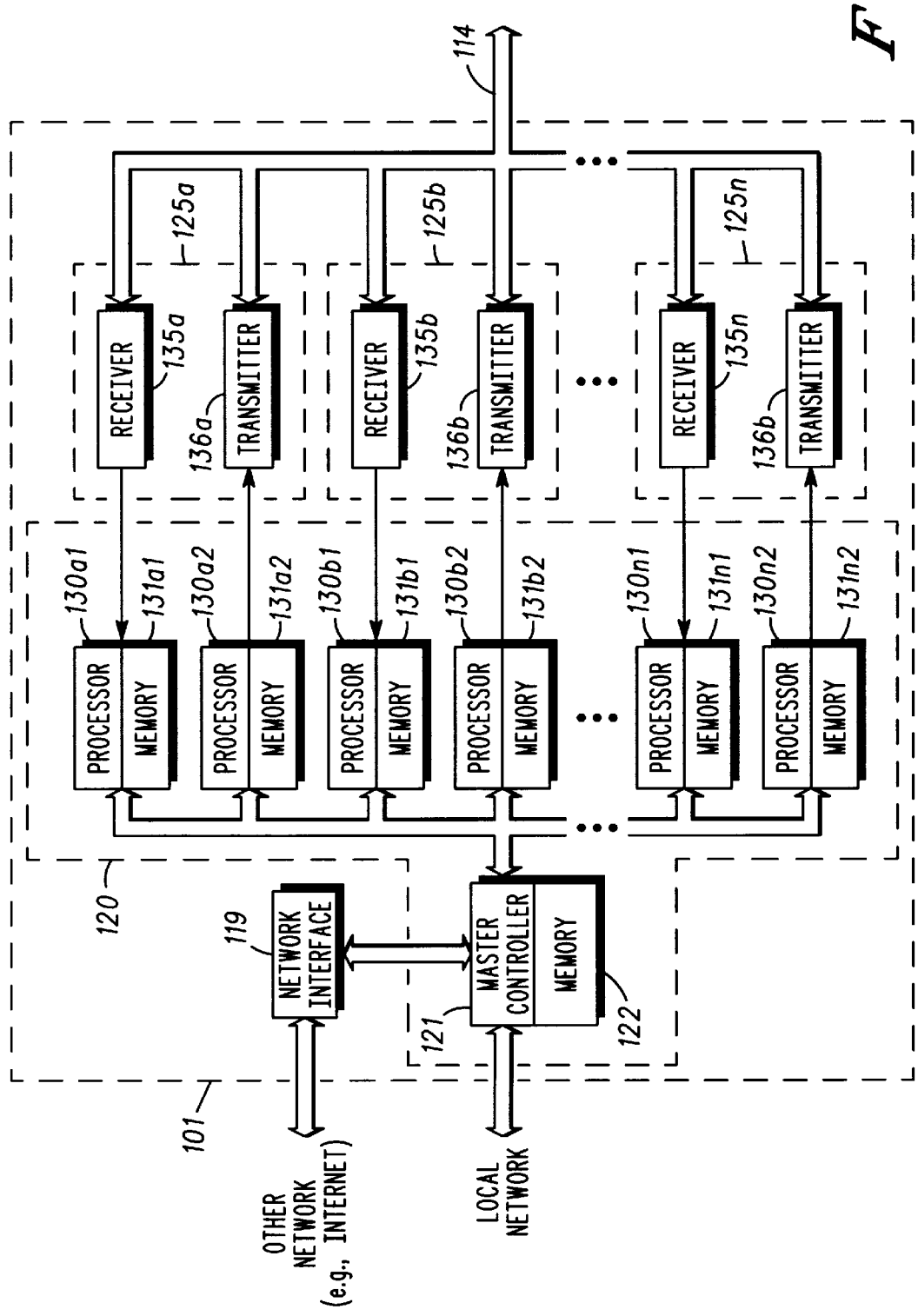
FIG. 2 is a block diagram illustrating a primary station apparatus in accordance with the present invention.

FIG. 2 is a block diagram illustrating a primary station 101 in accordance with the present invention. The primary station 101 (also referred to as a primary transceiver) is coupled to a communication medium 114 for upstream and downstream communication to one or more secondary stations (not illustrated), and is coupleable to a network, such as the Internet, through a network interface 119. The primary station includes a processor arrangement 120 which is connected to a plurality of channel interfaces, channel interface $125_a$ through channel interface $125_n$, for communication over the communication medium 114. The processor arrangement 120 includes a master controller 121 having or connected to memory 122, and one or more additional processors $130_{a1}$ through $130_{n2}$ and corresponding associated memories $131_{a1}$ through $131_{n2}$. In the preferred embodiment, the master controller 121 is a Motorola M68040 processor, and the memory 122 is 16 MB RAM. The master controller 121 performs a variety of higher level functions in the preferred embodiment, such as the spectrum management of the present invention, plus other functions such as routing, management of secondary stations, and communication protocol management (such as SNMP management). The master controller 121 is connected to a plurality of other processors, collectively referred to as processors 130 and separately illustrated as processor $130_{a1}$, processor $130_{a2}$, through processor $130_{n1}$ and processor $130_{n2}$. Each of these processors, processor $130_{a1}$, processor $130_{a2}$, through processor $130_{n1}$ and processor $130_{n2}$, is also coupled to or contains corresponding memory circuits, memory $131_{a1}$, memory $131_{a2}$, through memory $131_{n1}$ and memory $131_{n2}$. In the preferred embodiment, each of these processors 130 are also Motorola M68040 processors, while the corresponding memory circuits, memory $131_{a1}$ through memory $131_{n2}$, are 4 MB RAM. In the preferred embodiment, the processors 130 perform such functions related to upstream and downstream data protocols, such as sending a poll message or an acknowledgment message downstream. Each of these processors $130_{a1}$ through $130_{n2}$ of the processor arrangement 120 are connected to corresponding receivers and transmitters of the channel interfaces, channel interface $125_a$ through channel interface $125_n$ (collectively referred to as channel interfaces 125), namely, receiver $135_a$ through receiver $135_n$ (collectively referred to as receivers 135) and transmitter $136_a$ through transmitter $136_n$ (collectively referred to as transmitters 136). In the preferred embodiment, depending upon the functions implemented, each of the receivers $135_a$ through $135_n$ may include a Motorola M68302 processor, a Motorola 56000 series digital signal processor, a ZIF SYN integrated circuit, and an LSI Logic L64714 (Reed-Solomon decoder), for demodulation and for decoding forward error correction and cyclic redundancy checks. In the preferred embodiment, also depending upon the functions implemented, each of the transmitters $136_a$ through $136_n$ may include a Motorola M68302 processor, a Motorola 56000 series digital signal processor, a ZIF SYN integrated circuit, and an LSI Logic L64711 (Reed-Solomon encoder), for modulation and for coding for forward error correction and cyclic redundancy checks. As a consequence, as used herein, the channel interfaces 125 may be considered to perform the functions of data and other signal reception and transmission, regardless of the specific hardware implementations and additional functions which may or may not be implemented. The various memories illustrated, such as memory 122 or $131_{a1}$, may also be embodied or contained within their corresponding processors, such as master controller 121 or processor $130_{a1}$. The functions of these various components with respect to the present invention are explained in greater detail below with reference to FIGS. 4–12.

In the preferred apparatus embodiment illustrated in FIG. 2, the spectrum management method discussed below with reference to FIGS. 4 through 12 may be programmed and stored, as a set of program instructions for subsequent execution, in the processor arrangement 120, and more particularly, in the master controller 121 and its associated memory 122 of a primary station, such as primary station 101 illustrated in FIG. 2. Information from secondary stations, which are discussed below with reference to FIG. 3, such as downstream channel bit error and packet error rates, may be obtained from forward error correction encoders and/or decoders, such as the LSI Logic L64711 and L64714 integrated circuits, included in the channel interface circuit 160. Similar information for upstream channel bit error and packet error rates may be obtained from forward error correction encoders and/or decoders, such as the LSI Logic L64711 and L64714 integrated circuits, included in the channel interface circuits 125.

Figure 3:
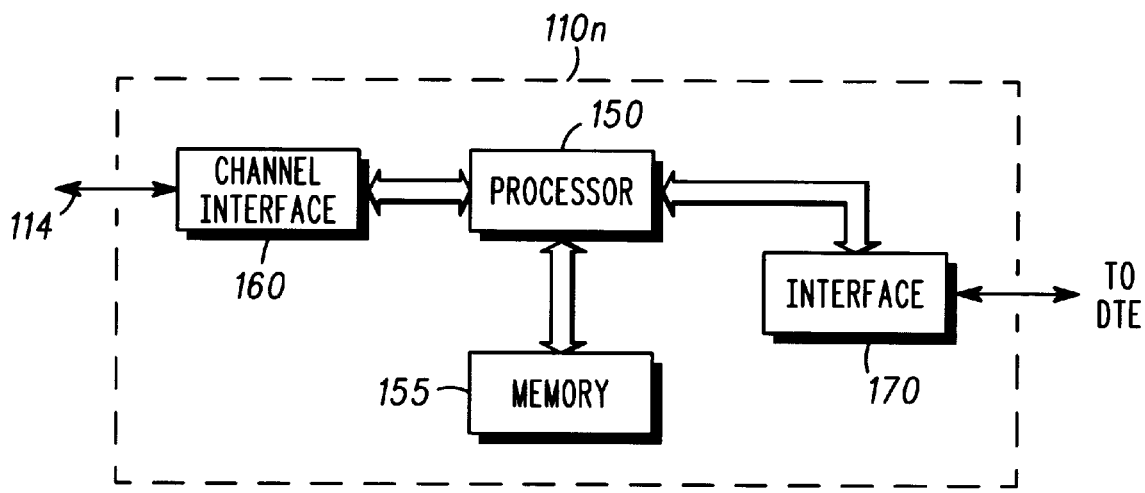
FIG. 3 is a block diagram illustrating a secondary station apparatus in accordance with the present invention.

FIG. 3 is a block diagram illustrating a secondary station $110_n$ in accordance with the present invention. The secondary station $110_n$ includes a processor 150, with the processor 150 having or coupled to a memory 155. In the preferred embodiment, the processor 150 is a Motorola M68302 processor (also known as an integrated multiprotocol processor), and the memory 155 is 256 K RAM. The processor 150 is coupled to an interface 170, such as an ethernet port or an RS232 interface, for connection to a computer, a workstation, or other data terminal equipment. The processor 150 is also coupled to a channel interface 160 for communication over the communication medium 114. The channel interface 160, in the preferred embodiment, depending upon the functions implemented, includes a Motorola M68HC11 integrated circuit, a ZIF SYN integrated circuit, a Broadcom BCM3100 QAMLink integrated circuit, a Motorola TxMod integrated circuit, and LSI Logic L64711 and L64714 integrated circuits, and performs such functions as forward error correction encoding and decoding, QAM demodulation (for downstream reception), $\pi/4$-DQPSK modulation (for upstream transmission), transmit level and frequency adjustment, for data and other signal reception and transmission. As a consequence, as used herein, the channel interface 160 may be considered to perform the functions of data and other signal reception and transmission, regardless of the specific hardware implementations and additional functions which may or may not be implemented. The memory illustrated as memory 155 may also be embodied or contained within the corresponding processor 150. The additional functions of these components of the secondary station $110_n$ with respect to the invention are also described in greater detail below with reference to FIGS. 4–12.

As discussed in greater detail below, the apparatus and method of the present invention provides for spectrum management, namely, channel allocation (or assignment), to optimize overall performance of a communication system 100 and to optimize performance to end users, typically consumers, who are utilizing secondary stations $110_a$–$110_n$, under a variety of conditions. The first set of conditions, discussed with reference to FIGS. 4 and 5, concern various types of noise conditions, such as ingress noise and impulse noise. The second set of conditions, discussed with reference to FIGS. 6 and 7, concern channel loading conditions as devices such as secondary stations enter or come on line in the communication system 100, because as such devices come on line, there may be sudden bursts of activity (data transmission and reception), which should be considered in performance optimization. The third set of conditions, discussed with reference to FIGS. 8 and 9, concern channel loading conditions for active devices, such as secondary stations, any of which may utilize large or small portions of any given channel at any given time, with concomitant potential to overuse or monopolize available bandwidth, impacting data throughput and system responsiveness. The fourth set of conditions, discussed with reference to FIGS. 10 and 11, concern congestion conditions, which also impacts data throughput and system responsiveness. Lastly, in FIG. 12, overall spectrum management utilizing all four types of conditions is illustrated. It should be understood that these various processes, routines or subroutines illustrated may be and most likely will be repeated, on an ongoing basis, for overall spectrum management. As a consequence, when a particular portion of the spectrum management method is terminated, as described below, it should be understood to mean that the particular iteration is terminated, as the process may be continually repeated. In addition, various steps, such as steps 710 and 810 of congestion management, are event driven, rather than poll driven, i.e., the congestion parameters are continually monitored, so that when a congestion condition occurs, it is an event which automatically causes the remaining congestion alleviation activities. As a consequence, no limitation should be inferred or implied, for any given step, concerning whether it is event or poll driven.

Throughout the specification, channel assignment, reassignment or allocation, and transferring of receivers and transmitters to other channels, are frequently discussed. As illustrated in FIGS. 2 and 3, such channel assignment, reassignment or allocation, and transferring of receivers and transmitters to other channels, should be understood to include or refer to the underlying physical or apparatus activities, such as the transfers of the corresponding transmitters and receivers. For example, when a transmitter of a secondary station is transferred from an unusable upstream channel to another, second upstream channel, a corresponding primary station receiver will also be transferred to the second channel, and similarly, when a receiver of a secondary station is transferred, a corresponding primary station transmitter may also be transferred, depending upon the circumstances.

Also throughout the specification, various thresholds are frequently employed to describe how an outcome of a comparison, such as a branching of a method, may occur. While referred to as thresholds, it should be understood that such thresholds may have a variety of forms, and may also include allowable or desirable tolerances and variances. In addition, the thresholds may not only be fixed or predetermined, the thresholds may be adaptive and vary over time, depending upon external conditions and depending upon desired levels of performance.

Figure 4A:
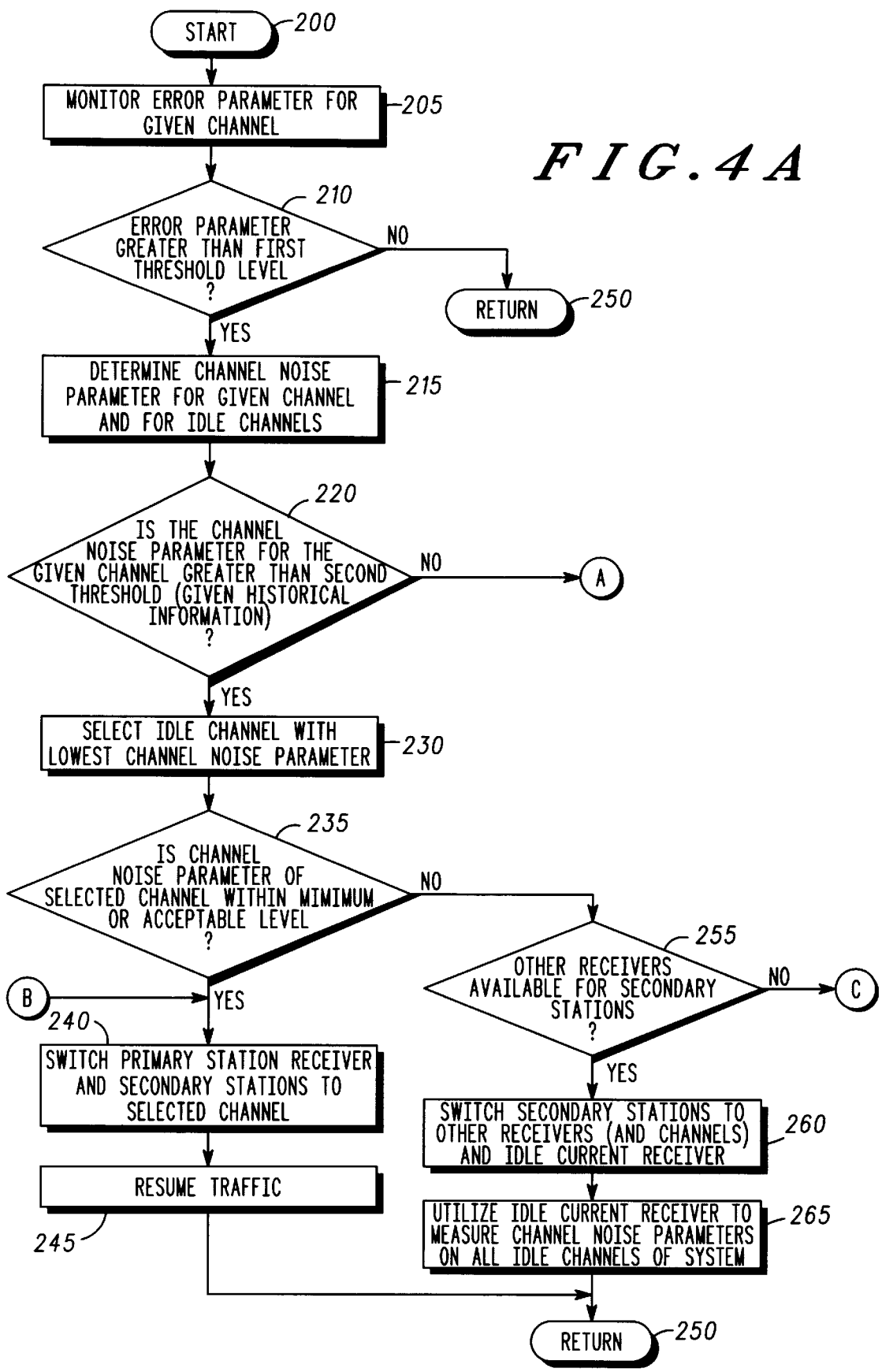
FIG. 4 is a flow chart illustrating upstream spectrum management under noise conditions in accordance with the present invention.
Figure 4B:
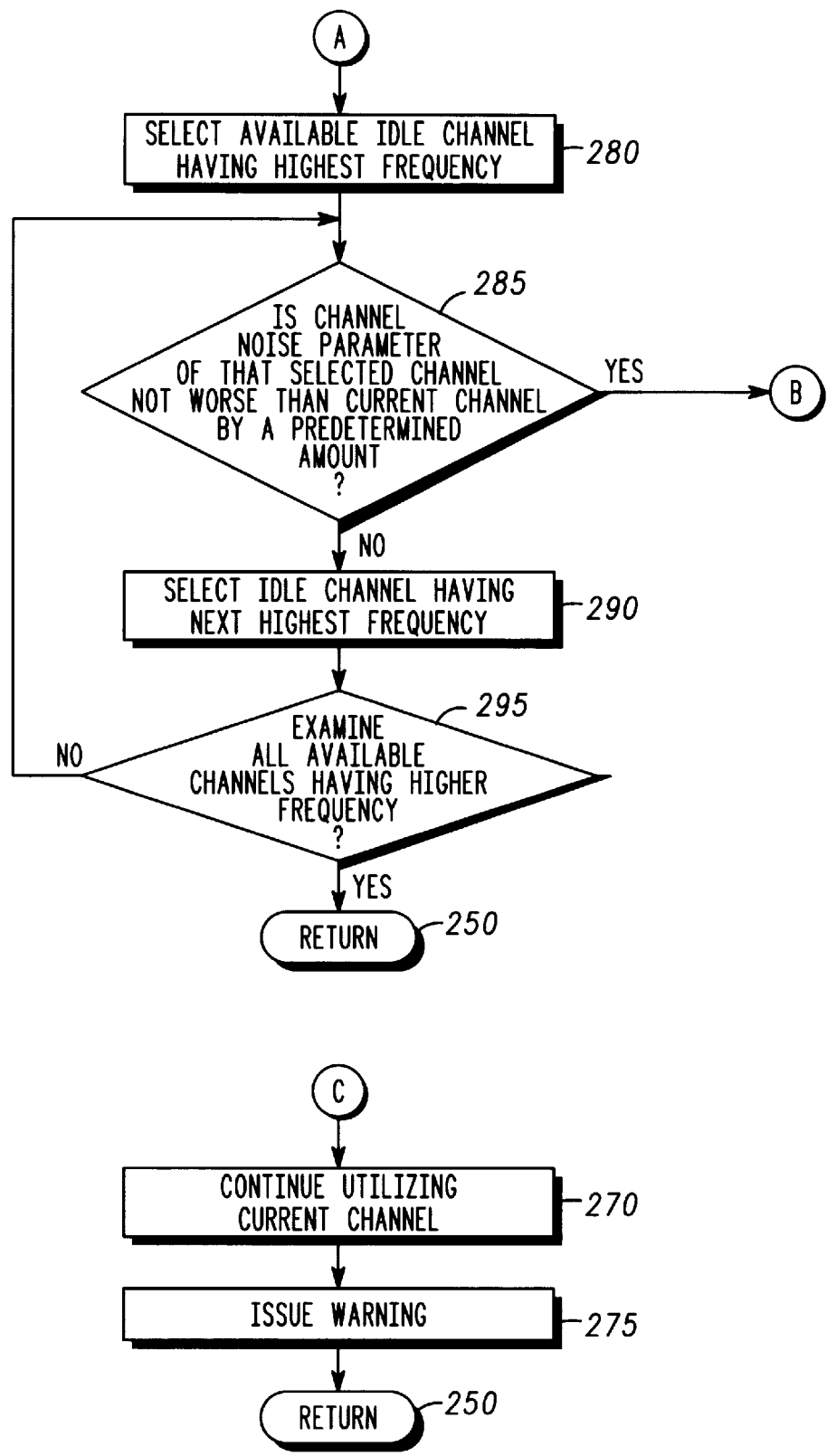

FIG. 4 is a flow chart illustrating upstream spectrum management under noise conditions in accordance with the present invention. Based upon various noise conditions on a given (or first) upstream channel, in accordance with the present invention, secondary devices operating on that given upstream channel may be switched to another (or second) channel having better conditions, to increase data throughput and optimize communication system performance. Beginning with start step 200, an error parameter for a given (or first) channel is monitored (or measured), step 205. In the preferred embodiment, the packet error rate is monitored by each processor $130_{n1}$ in the primary station 101, based upon the forward error correction performed by the corresponding receiver $125_n$ (i.e., errors in the packet which could not be corrected through the use of a selected forward error correction methodology). In other embodiments, other error parameters may be monitored or measured, such as bit error rates, block error rates, burst error rates, frame error rates, noise levels (such as levels of impulse noise or ingress noise), other interference, or other parameters or factors which could be correlated with channel quality. For example, monitoring an error rate may comprise monitoring a set of error rate parameters of a plurality of sets of error rate parameters in which the plurality of sets of error rate parameters consist of any of a plurality of combinations of a bit error rate, a packet error rate, a burst error rate, a block error rate, and a frame error rate. Next, in step 210, the error parameter is compared with a first predetermined or adaptive threshold, and if the error parameter is not greater than the first threshold, indicating that the error parameter is sufficiently or acceptably low, then nothing further needs to be performed with regard to upstream channel allocation under noise conditions and this portion of the method may terminate, return step 250. In the preferred embodiment, the first threshold is empirically determined, and may be predetermined (such as fixed) or adaptive, varying based upon historical information of the system and also vary according to the performance requirements of any given installation of the communication system 100. In step 210, however, if the error parameter is greater than the first predetermined threshold, indicating that the error parameter is unacceptably high, then based upon the presumption that the error is due to noise, distortion or other interference on the given channel, the method determines or measures a channel noise parameter for the given upstream channel, while it is idle (all coupled secondary stations not transmitting upstream), and for all idle upstream channels, step 215. In the preferred embodiment, the channel noise parameter is the received signal strength which, when measured while the channel is idle, provides an indication of noise levels, and is referred to as the received signal strength indicator ("RSSI"). The channel noise parameter may also be measured or determined utilizing other indicators, such as mean square error, phase or gain hits, nonlinear distortion, phase error, signal to noise ratios, and narrow band interference. Next, in step 220, the channel noise parameter for the given (or first) channel is compared to a second threshold. The second threshold may also be empirically determined, and may also vary over time and vary based upon any data accumulated over time for a given communication system 100 (historical data).

In step 220, if the channel noise parameter, such as the RSSI, is greater than the second threshold, the channel noise is considered to be ingress noise, and if the channel noise parameter, such as the RSSI, is less than the second threshold, the channel noise is considered to be impulse noise. Utilizing RSSI as the channel noise parameter, impulse noise is assumed to form a low average (or average out) over time, resulting in a lower noise parameter compared to ingress noise, which may be more constant or have a more constant level over time. The selection of other channel noise parameters may result in a different comparison result in step 220. For example, a different channel parameter, when compared to a corresponding threshold, may indicate ingress noise if less than the threshold and impulse noise if greater than the threshold. Accordingly, the method only requires that the channel noise parameter be utilized in such a way, such as through comparison to a particular threshold level, so as to distinguish or differentiate impulse noise from other types or characterizations of noise, such as ingress noise. As a consequence, in step 220, when the channel noise is considered to be ingress noise (e.g., the channel noise parameter, such as the RSSI, is greater than the second threshold), as explained in greater detail below, the method will attempt to find another (second) channel having less overall noise, and reallocate secondary stations to this other (second) channel. If in step 220, however, the channel noise is considered to be impulse noise (e.g., the channel noise parameter, such as the RSSI, is less than the second threshold), as explained in greater detail below, the method will attempt to find another (second) channel having a higher frequency than the current, given channel, based upon the consideration that impulse noise tends to diminish or roll off at higher frequencies.

Continuing to refer to FIG. 4, when the channel noise parameter indicates ingress noise in step 220, the method selects an idle channel having the lowest channel noise parameter, step 230, such as the idle channel having the lowest RSSI (as determined in step 215). Because of overhead (such as service disruption) associated with switching secondary stations or devices from one upstream channel to another upstream channel, in accordance with the present invention, secondary stations will only be switched to another channel if that channel is considerably better, i.e., secondary stations will not be switched from a bad channel to a bad (but somewhat better) channel. As a consequence, prior to switching any secondary stations from the given (first) channel to this selected (second) channel having the lowest channel noise parameter of the available idle channels, the channel noise parameter of the selected (second) channel is compared to a minimum acceptable level or threshold, step 235. If the channel noise parameter (such as the RSSI) of the selected (second) channel is less than the minimum acceptable level in step 235, then secondary stations or devices currently assigned to the given (first) channel will be reassigned to the selected (second) channel, step 240, along with the corresponding receiver and transmitter of the primary station. Once the devices have been transferred, upstream data transmission (or traffic) may resume, step 245, and this portion of the method may end, return step 250). In the preferred embodiment, this is accomplished by the transmission of a message from the primary station 101 to each of the secondary stations $110_a$–$110_n$ which have been operating on the given upstream channel.

Following step 235, if the channel noise parameter (such as the RSSI) of the selected (second) channel (which is the lowest channel noise parameter of the available idle channels), however, is not less than the minimum acceptable level in step 235, then the method determines whether receivers other than the given receiver for the given channel (such as any of the receivers $135_a$–$135_n$) are available for the secondary devices which are utilizing the given channel, step 255. If other receivers are available in step 255, then the secondary devices currently assigned to the given channel and given receiver are reassigned to the other receivers (and channels), and the current (given) receiver is idled, step 260. The idled current receiver may then be utilized to measure channel noise parameters (such as RSSI) on all the idle channels of the system, so that other receivers do not need to perform this task, step 265, and will monitor the idle channels for future use or reuse if and when the idle channels once again meet minimal requirements. This portion of the spectrum management methodology may then terminate, return step 250. If other receivers are not available in step 255, however, the method will continue to utilize the current, given channel, step 270, as no reasonable alternatives are available. In these circumstances, the method will provide a communication system warning, step 275, followed by terminating this portion of the method, return step 250.

Continuing to refer to FIG. 4, when the channel noise parameter indicates impulse noise in step 220, the method selects an idle channel having the highest available frequency because, while impulse noise may have an effect over a wide frequency band, impulse noise tends to diminish at higher frequencies, step 280. The channel noise parameter of the selected, higher frequency channel is compared to the channel noise parameter of the current, given channel, step 285. If in step 285 the channel noise parameter of the selected, higher frequency channel is not worse than the channel noise parameter of the current, given channel by a predetermined amount (i.e., the channel noise parameter of the selected, higher frequency channel is better than the combination consisting of the channel noise parameter of the current channel plus the predetermined amount), then secondary devices assigned to the current, given channel are switched to the selected, higher frequency channel, step 240 (followed by steps 245 and 250). The predetermined amount, such as 2 dB, may be empirically determined. This comparison step involves a balance or trade, namely, avoiding impulse noise, even if the avoidance results in slightly worse ingress noise. If in step 285 the channel noise parameter of the selected, higher frequency channel is worse than the channel noise parameter of the current, given channel plus the predetermined amount (i.e., the channel noise parameter of the selected, higher frequency channel is worse than the combination consisting of the channel noise parameter of the current channel plus the predetermined amount), then an idle channel is selected having the next highest frequency (higher than the frequency of the current channel), step 290. The comparison process of step 285 is repeated until either an acceptable higher frequency channel is found, or all available channels having a higher frequency have been examined (and none are better), step 295, and this iteration of the upstream channel allocation portion of the spectrum management method terminates, return step 250.

As indicated above, the channel noise parameter may be any number or type of indicator, and is an RSSI in the preferred embodiment, measured when the selected channel has been idled. In the preferred embodiment, the RSSI measurement is made utilizing an average of eight sets of samples, where each sample spans 16 symbols (with a symbol rate of 384,000 and 2 bits/symbol). In addition to utilization of a statistical average (mean) other statistical information may be applied to evaluate the channel noise parameter indications such as, for example, the mean and standard deviation (or other measure of variance). For example, a high standard deviation within the samples may indicate a narrow peak of noise, indicative of impulse noise rather than ingress noise. In addition, depending upon the type of statistical information to be gathered, the number of samples and the duration of the samples may also be varied.

Figure 5:
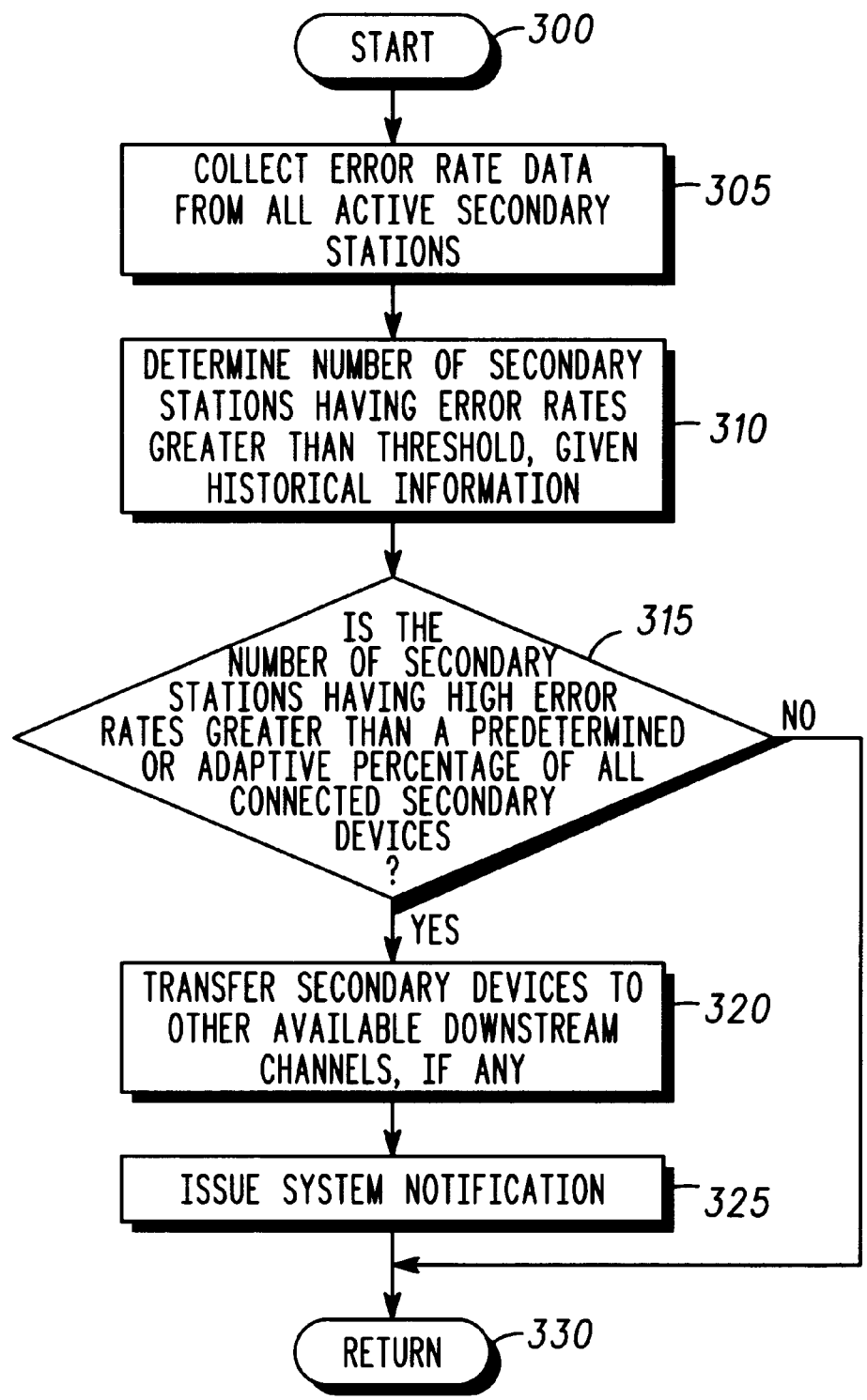
FIG. 5 is a flow chart illustrating downstream spectrum management under noise conditions in accordance with the present invention.

FIG. 5 is a flow chart illustrating downstream spectrum management under noise conditions in accordance with the present invention. Based upon various noise conditions on a given (or first) downstream channel, in accordance with the present invention, secondary devices operating on that given downstream channel may be switched to another (or second) channel having better noise conditions, to increase data throughput and optimize communication system performance. Beginning with start step 300, downstream error rate data is collected (via upstream channels) from all secondary stations connected and active (powered on and periodically or frequently receiving information or other data) on the current, given downstream channel, step 305, such as the packet error rate seen by each active secondary station. Next, in step 310, the method determines the number of secondary stations having error rates greater than a predetermined threshold. The predetermined threshold may be empirically determined, or may be based upon system data gathered over time (historical information or data). If the number of secondary stations having high error rates is not greater than a predetermined percentage (or adaptive threshold) of all connected secondary stations in step 315, indicating that most secondary devices are not experiencing excessively high error rates, then nothing further needs to be performed currently with regard to downstream channel allocation under noise conditions and this portion of the method may terminate, return step 330. If the number of secondary stations having high error rates is greater than the predetermined percentage (or adaptive threshold) of all connected secondary stations in step 315, indicating that a sufficient number or percentage of secondary devices are experiencing excessively high error rates, then the current, given downstream channel is unacceptable, and secondary stations are reassigned to other downstream channels, if any are available, step 320. Alternatively, it may be the case that when one downstream channel is unacceptable that all other downstream channels may be experiencing similar noise or other interference problems and, in which case, step 320 may be omitted. Next, a system notification or warning is issued, step 325, followed by terminating this iteration of the downstream channel allocation portion of the spectrum management methodology, return step 330.

As indicated above, the predetermined threshold utilized in step 315 may also be adaptive. In the communication system 100, it is anticipated that downstream channels may be subject to minimum standards or other governmental regulation. As a consequence, it may be more likely that a particular secondary station connected to the downstream channel, or a section or a branch of a downstream channel, are experiencing high error rates, rather than an entire downstream channel. A high error rate experienced by one or only a few secondary stations on a downstream channel, first, may provide topological information concerning the communication system 100 and, second, distinguishes a possibly malfunctioning secondary station from a possibly malfunctioning downstream channel. As a consequence, prior to designating a downstream channel as malfunctioning or unacceptable, a predetermined or adaptive percentage of secondary stations should be having high error rates, rather than a few isolated secondary stations. This threshold level may be adaptive as well, varying in light of communication system activity, topological information, and historical information.

Other historical information may also be influential in development of the various thresholds referred to above, and for determinations of various communication system performance and quality metrics and other evaluations. In addition, as discussed in greater detail below, such historical information may also have predictive value, for example, to enhance the decision methodology employed in channel reallocation, such as in congestion management. As an example, it may be undesirable to add additional secondary stations to a particularly channel, if there is historical (or database) information indicating that the channel is likely to become congested. Relevant historical or database information may include, for example, system performance based upon the time of day, and especially during times in which there may be greater or additional sources of noise or other interference. Such time of day information may include early morning use of hair dryers, neighboring amateur radio antenna leakage at a particular time of the day, evening interference from televisions, or other sources of interference such as electric motors. As this historical information may be developed, it may be useful in distinguishing communication system performance, such as a malfunction, from other potential causes of error and system degradation.

Such historical information may also be utilized to distinguish impulse noise from ingress noise, useful for step 220 of FIG. 4. For example, a continuous degradation of a channel may be indicative of ingress noise, whereas a satisfactory channel with a sudden increase in error may be indicative of impulse noise. Such historical information may also be useful for making channel noise parameter measurements, such as an RSSI. For example, historical information may be useful to adaptively control the time window or duration of samples and the number of samples performed.

Figure 6:
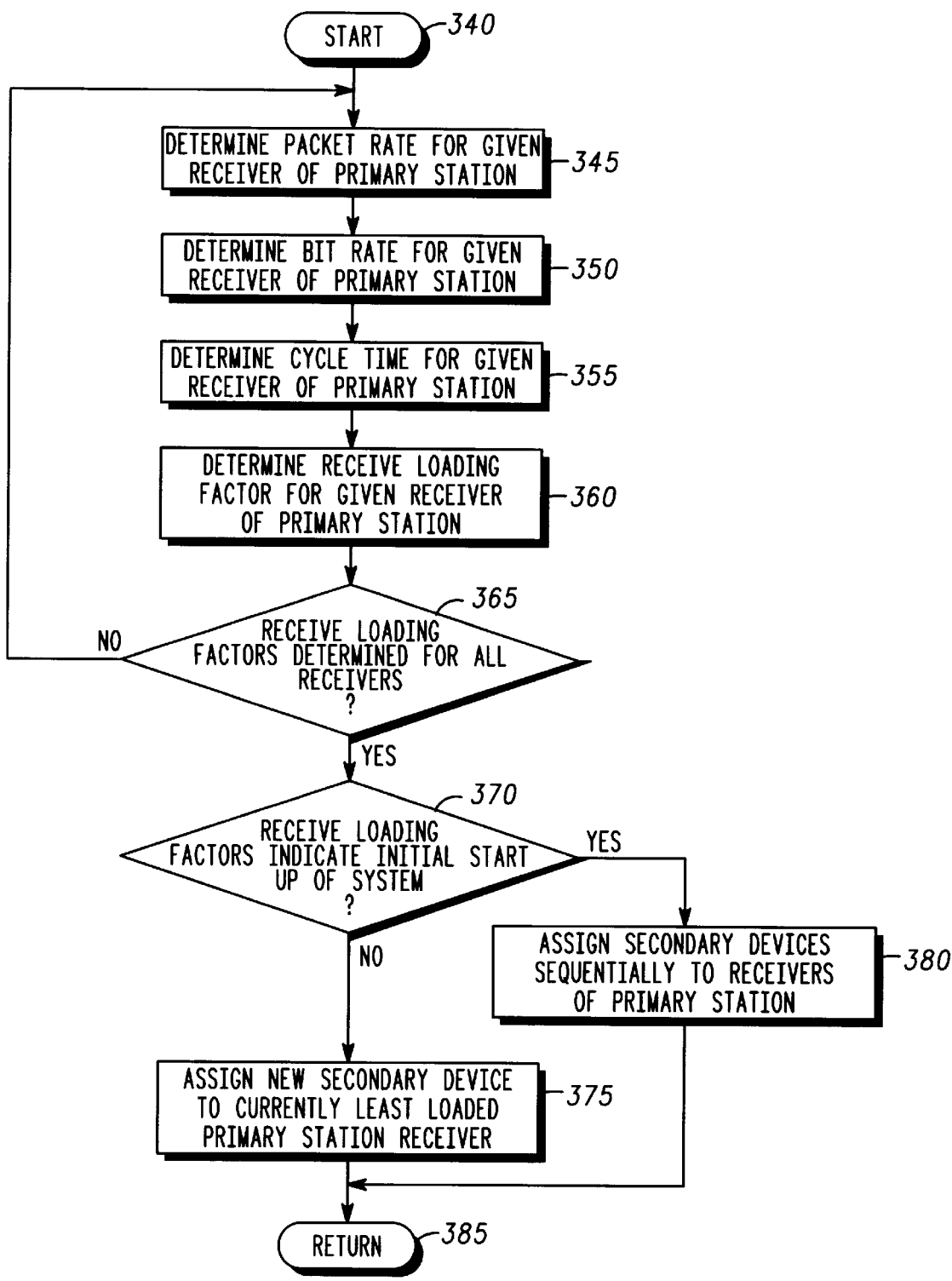
FIG. 6 is a flow chart illustrating upstream channel loading for secondary devices entering the communication system in accordance with the present invention.

FIG. 6 is a flow chart illustrating upstream channel loading for secondary devices entering or coming on line in the communication system in accordance with the present invention. As secondary stations or devices are powered up and come on line, they will be assigned an upstream channel connected to a particular receiver $135_n$ of the primary station 101, and the upstream channel loading for the various receivers will be varied or balanced in accordance with this portion of the spectrum management methodology. Beginning with start step 340, a receive loading factor will be determined for each receiver $135_n$. In the preferred embodiment, for each receiver $135_n$, a packet rate (packets/second) will be determined in step 345, a bit rate (bits/second) will be determined in step 350, and a cycle time will be determined in step 355. The cycle time is a measure of the time taken to reach every secondary station (connected to the particular receiver) according to the particular protocol. In the preferred embodiment, utilizing a polling protocol, the cycle time is the average time to perform one iteration of polling all secondary stations (with the corresponding acknowledgment messages transmitted upstream by each of the secondary stations), and measures how long the system will take to respond to a given secondary station (with corresponding potential impact on consumer satisfaction). Other factors may also be utilized in the determination of the receive loading factor. In addition, the receive loading factor may be a weighted combination of these factors such as cycle time, packet and bit rates. Next, in step 360, the receive loading factor is determined which, in the preferred embodiment, is a weighted sum of the cycle time, the bit rate and the packet rate. In some circumstances, the cycle time may also be the predominant or sole measurement forming the receive loading factor. Next, in step 365, the process returns to step 345, repeating steps 345–360 for each receiver, until receive loading factors have been determined for all receivers. If the receive loading factors indicate initial system start up or initialization in step 370, such as all or most receivers having low or negligible loading factors, then entering secondary devices are assigned to the receivers in a "round robin" fashion, with each entering secondary station sequentially assigned to the receivers of the primary station, step 380. If the receive loading factors do not indicate initial system start up or initialization in step 370, such as all or most receivers having non-negligible loading factors, then each entering secondary device is assigned to the currently least loaded receiver, step 375. This iteration of the upstream loading portion of the spectrum management method may then terminate, return step 385, or may continue with step 515 discussed below with reference to FIG. 8.

Figure 7:
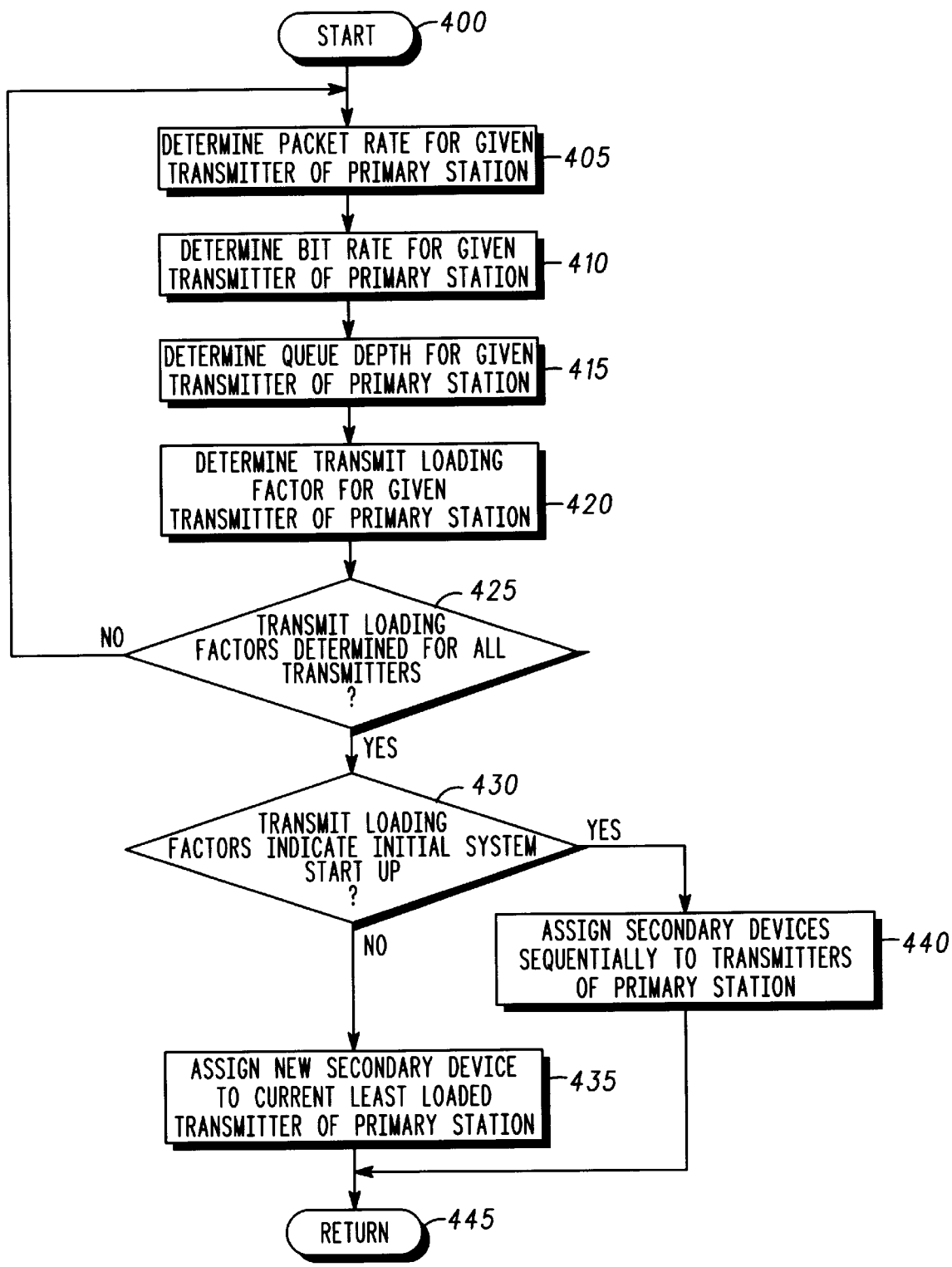
FIG. 7 is a flow chart illustrating downstream channel loading for secondary devices entering the communication system in accordance with the present invention.

FIG. 7 is a flow chart illustrating downstream channel loading for secondary devices entering the communication system in accordance with the present invention. As secondary stations or devices are powered up and come on line, they will be assigned a downstream channel connected to a particular transmitter $136_n$ of the primary station 101, and the downstream channel loading for the various primary station transmitters will be varied or balanced in accordance with this portion of the spectrum management methodology. Beginning with start step 400, a transmit loading factor will be determined for each transmitter $136_n$. In the preferred embodiment, for each transmitter $136_n$, a packet rate (packets/second) will be determined in step 405, a bit rate (bits/second) will be determined in step 410, and a queue depth will be determined in step 415. The queue depth is a measure of a backlog, if any, of the number of data or information packets or frames waiting to be transmitted downstream to all of the various secondary stations. In the preferred embodiment, downstream messages are broadcast to all secondary stations, with identification information for reception by the intended secondary station, such that queue depth is a measure of how long each secondary station must wait to receive its requested information (with corresponding potential impact on consumer satisfaction). Other factors may also be utilized in the determination of the transmit loading factor. In addition, the transmit loading factor may be a weighted combination of these factors such as queue depth, packet and bit rates. Next, in step 420, the transmit loading factor is determined which, in the preferred embodiment, is a weighted sum of the queue depth, the bit rate and the packet rate. In some circumstances, the queue depth may also be the predominant or sole measurement forming the transmit loading factor. Next, in step 425, the process returns to step 405, repeating steps 405–420 for each transmitter, until transmit loading factors have been determined for all transmitters. If the transmit loading factors indicate initial system start up or initialization in step 430, such as all or most transmitters having low or negligible transmit loading factors, then entering secondary devices are assigned to the transmitters in a "round robin" fashion, with each entering secondary station sequentially assigned to the transmitters of the primary station, step 440. If the transmit loading factors do not indicate initial system start up or initialization in step 430, such as all or most transmitters having non-negligible transmit loading factors, then each entering secondary device is assigned to the currently least loaded transmitter, step 435. This iteration of the downstream loading portion of the spectrum management method may then terminate, return step 445, or may continue with step 615 discussed below with reference to FIG. 9.

Figure 8A:
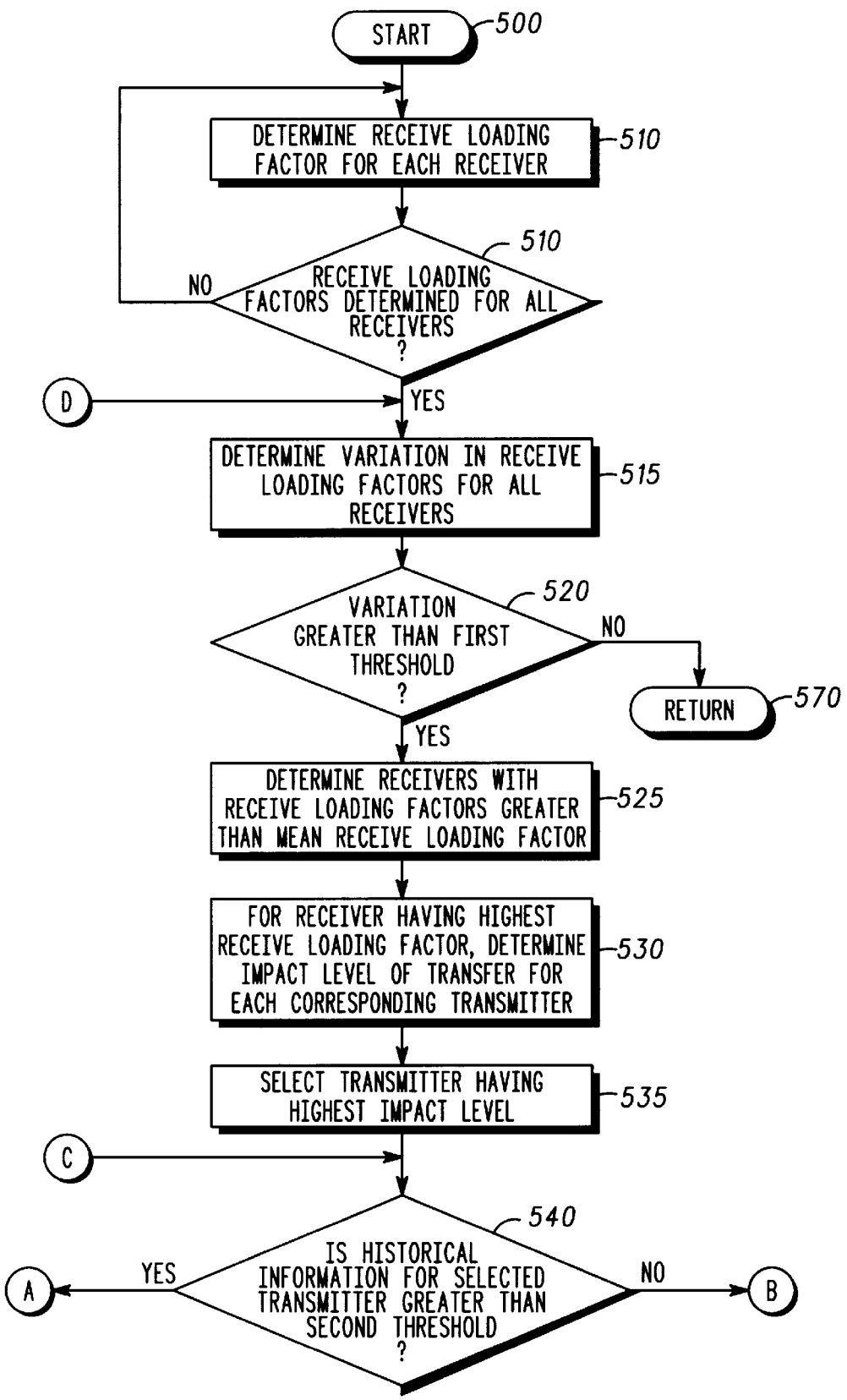
FIG. 8 is a flow chart illustrating upstream channel loading for active secondary devices of the communication system in accordance with the present invention.
Figure 8B:
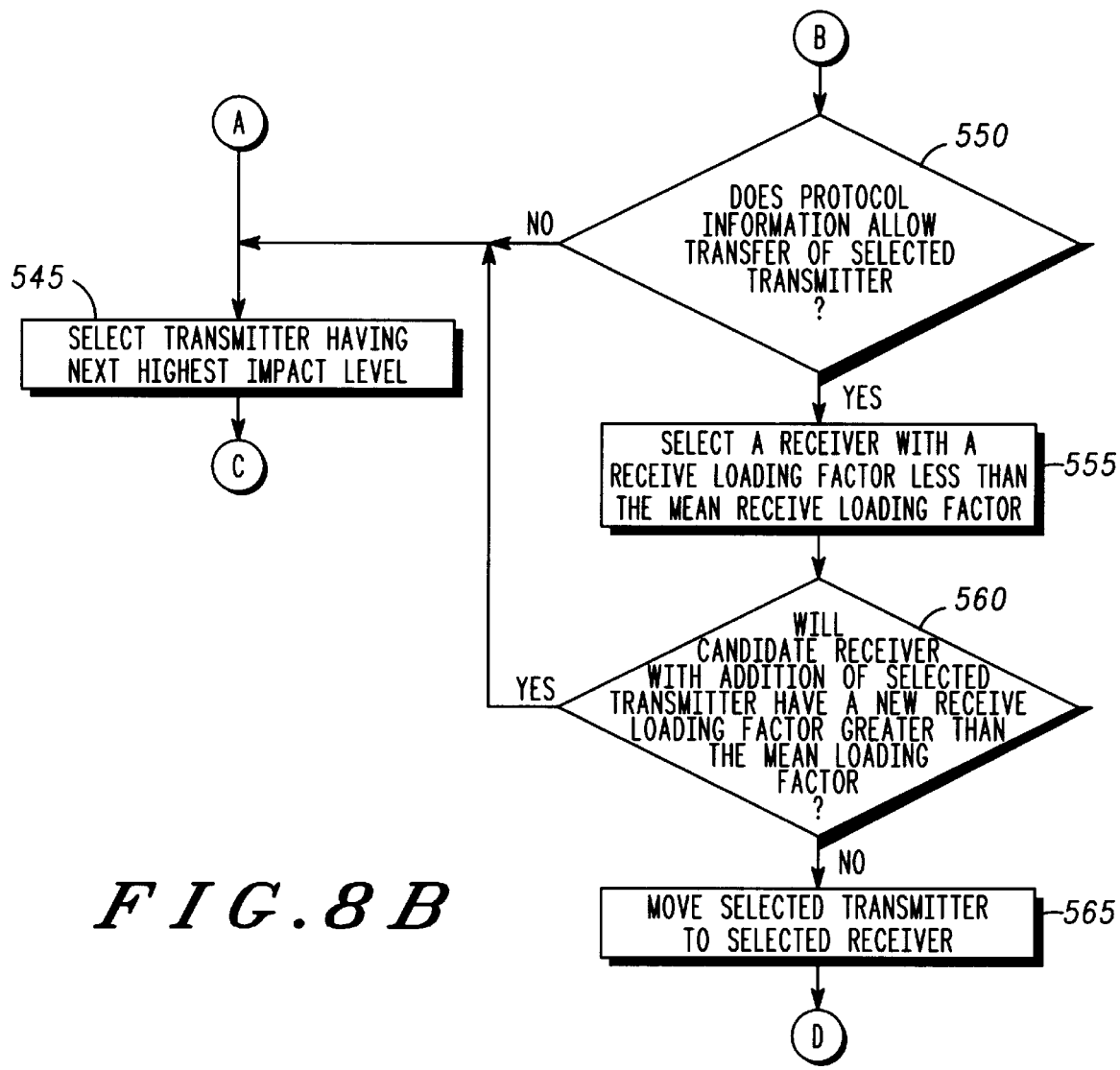

FIG. 8 is a flow chart illustrating upstream channel loading for active secondary devices of the communication system in accordance with the present invention. In accordance with this portion of the spectrum management method, if a receiver of a primary station is comparatively overloaded, namely, having too many active secondary stations transmitting on an upstream channel, some of the secondary station transmitters will be transferred to other, less loaded primary station receivers (operating on other upstream channels). Beginning with start step 500, receive loading factors are determined for each primary station receiver, step 505, until receive loading factors have been determined for all receivers of a primary station 101, step 510. When these determinations may have been made during steps 345–365 discussed above, this portion of the spectrum management method may also directly proceed beginning with step 515. In step 515, the variation in the receive loading factors (for all primary station receivers) is determined. If the variation in receive loading factors is not greater than a predetermined (or adaptive) threshold, step 520, indicating that all primary station receivers have similar loading within a particular range (or variance), then no further adjustments need to be made with regard to the upstream channel loading for active secondary devices, and this iteration of the upstream channel loading portion of the spectrum management method may terminate, return step 570. If the variation in receive loading factors is greater than a predetermined (or adaptive) threshold in step 520, indicating that all primary station receivers do not have similar loading within a particular range (or variance), then primary station receivers (of the plurality of primary station receivers 135) are selected which have receive loading factors which are greater than the mean receive loading factor, step 525. Secondary station transmitters will then be transferred from heavily loaded primary station receivers to more lightly loaded primary station receivers, depending upon various conditions. For example, only secondary station transmitters which would have an impact if transferred, namely, decreasing the receive loading factor for the given primary station receiver, will be transferred, provided that the transfer does not result in overloading yet another primary station receiver. Moreover, to avoid excessive service disruptions, excessive transfers of secondary stations (either or both transmitter and receiver) should also be avoided.

As a consequence, in step 530, for the primary station receiver having the highest receive loading factor, an impact level of a transfer, for each corresponding transmitter (of the secondary stations), is determined. For example, a transfer of a secondary station transmitter which is transmitting very little information upstream may have a negligible impact on decreasing the receive loading factor of the selected primary station receiver and, therefore, little would be gained by transferring the secondary station transmitter. Next, in step 535, the secondary station transmitter having the highest impact level, if transferred, is selected. To avoid transferring the same secondary station transmitter an excessive number of times, with concomitant potential service disruption, in step 540, if the historical information for the selected secondary station transmitter is greater than a predetermined or adaptive threshold, e.g., the selected secondary station transmitter has already been transferred recently, then another (second) secondary station transmitter having the next highest impact level is selected, step 545. The second secondary station transmitter having the next highest impact level is also evaluated for possible transfer, returning to step 540. If in step 540 the historical information for the selected secondary station transmitter is not greater than the predetermined or adaptive threshold, e.g., the selected secondary station transmitter has not been transferred recently, then the selected secondary station transmitter is evaluated to determine whether protocol information indicates that a transfer of the selected secondary station transmitter would be allowable, step 550. For example, protocol information may indicate that the particular secondary station (having the transmitter) is heavily involved in a particular application, such as a downstream file transfer requiring the upstream transmission of acknowledgment messages as packets are received, and as a consequence, because a transfer of upstream channels may excessively impact the downstream application, this secondary station transmitter may not be a good candidate for upstream channel transfer. In addition, other protocol information, such as previously transmitted upstream information requesting a file transfer or other application, may also indicate that this secondary station transmitter may not be a good candidate for upstream channel transfer. Accordingly, if such protocol information indicates that a transfer of the selected transmitter of the secondary station would be inadvisable in step 550, another secondary station transmitter (having the next highest impact level if transferred) is selected, returning to step 545.

Continuing to refer to FIG. 8, if the protocol information indicates that a transfer of the selected secondary station transmitter would be allowable in step 550, then a second primary station receiver, having a receive loading factor less than the mean receive loading factor, is selected in the primary station (or in another primary station servicing the same secondary station), step 555, for evaluation as a candidate primary station receiver (to which the secondary station transmitter from the selected, heavily loaded primary station receiver may be transferred) (step 560). In the preferred embodiment, the primary station receiver having the smallest receive loading factor is selected as the second (or candidate) primary station receiver. Other information may also be pertinent in the selection of the candidate primary station receiver; for example, other historical information, such as error rate and noise levels, may indicate that additional secondary station transmitters should not be transferred to the candidate primary station receiver, or an excessively high error rate may result. In step 560, if the candidate primary station receiver would, with the proposed transfer (i.e., with the additional impact of the selected secondary station transmitter), have a new receive loading factor which is still less than (or equal to) the mean receive loading factor, then the selected secondary station transmitter may be transferred to this candidate primary station receiver, step 565. Following such a transfer in step 565, the process may be repeated, returning to step 515, to continue to balance the upstream channel loading across all the receivers of the primary stations. In step 560, however, if the candidate primary station receiver would, with the proposed transfer (i.e., with the additional impact of the selected secondary station transmitter), have a new receive loading factor which is greater than the mean receive loading factor, potentially overloading the candidate primary station receiver, then the selected secondary station transmitter should probably not be transferred to this candidate primary station receiver. Protocol information and other predictive information may also indicate, in step 560, that a transfer may be ill advised because, while the candidate primary station receiver may currently (with the additional impact of the selected secondary station transmitter) have a receive loading factor less than the mean, anticipated traffic (based upon protocol information) may indicate that the receive loading factor soon will be greater than the mean, and the selected secondary station transmitter should probably not be transferred. In these cases, when the selected secondary station transmitter should probably not be transferred to this candidate primary station receiver in step 560, the method may proceed to step 545, to select another (second or third) secondary station transmitter having the next highest impact level for evaluation for possible transfer. Alternatively, if the primary station receiver having the smallest receive loading factor was not already selected in step 555 and evaluated in step 560, then the method may select another (second) candidate primary station receiver for evaluation for possible transfer of the selected secondary station transmitter, returning to step 555. As may be apparent from the above discussion, as this portion of the spectrum management process continues to iterate, transmitters of secondary stations will be transferred from heavily loaded primary station receivers to less loaded primary station receivers, resulting in receive loading factors moving toward the mean and balanced loading across upstream channels.

Figure 9A:
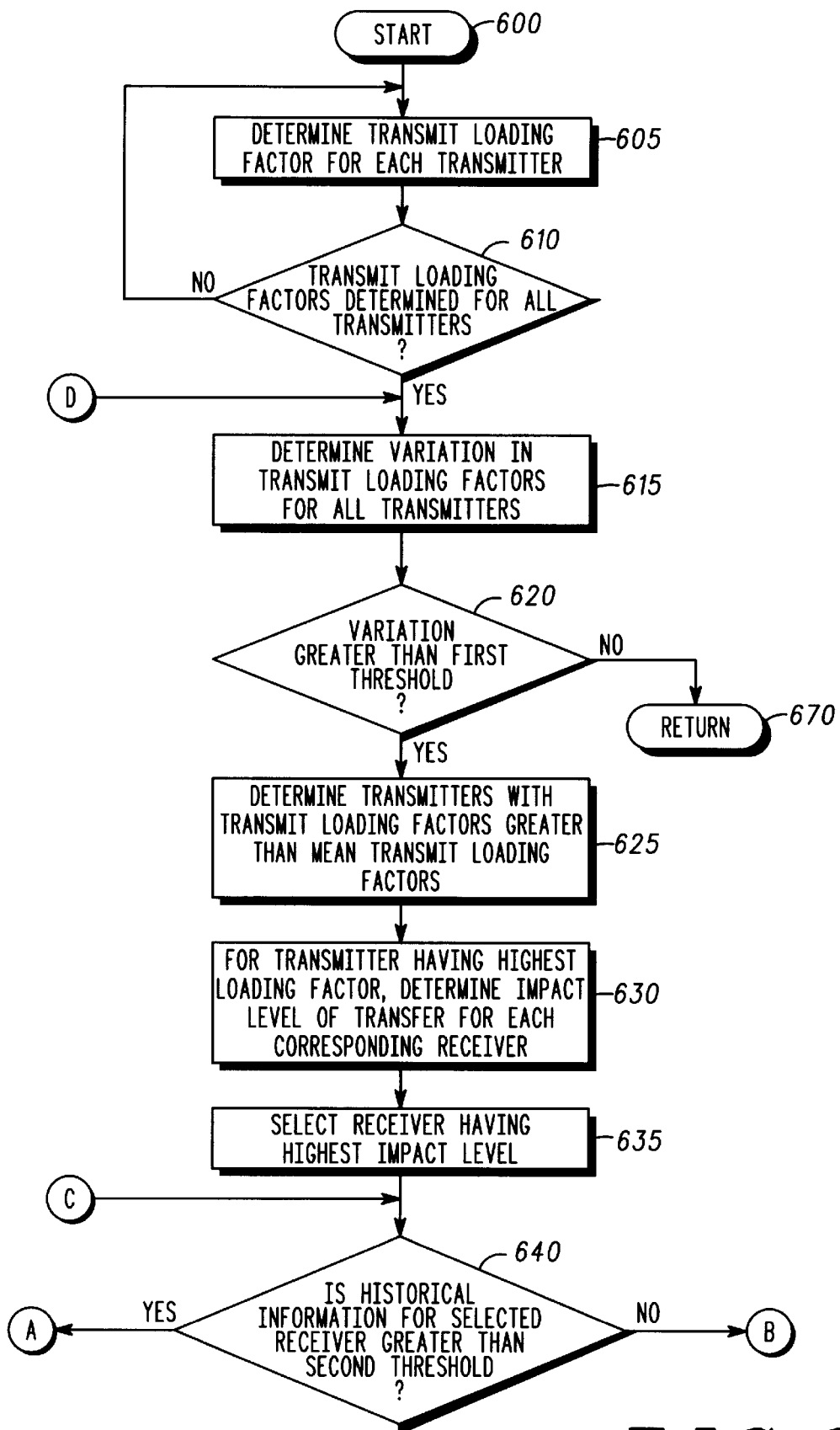
FIG. 9 is a flow chart illustrating downstream channel loading for active secondary devices of the communication system in accordance with the present invention.
Figure 9B:
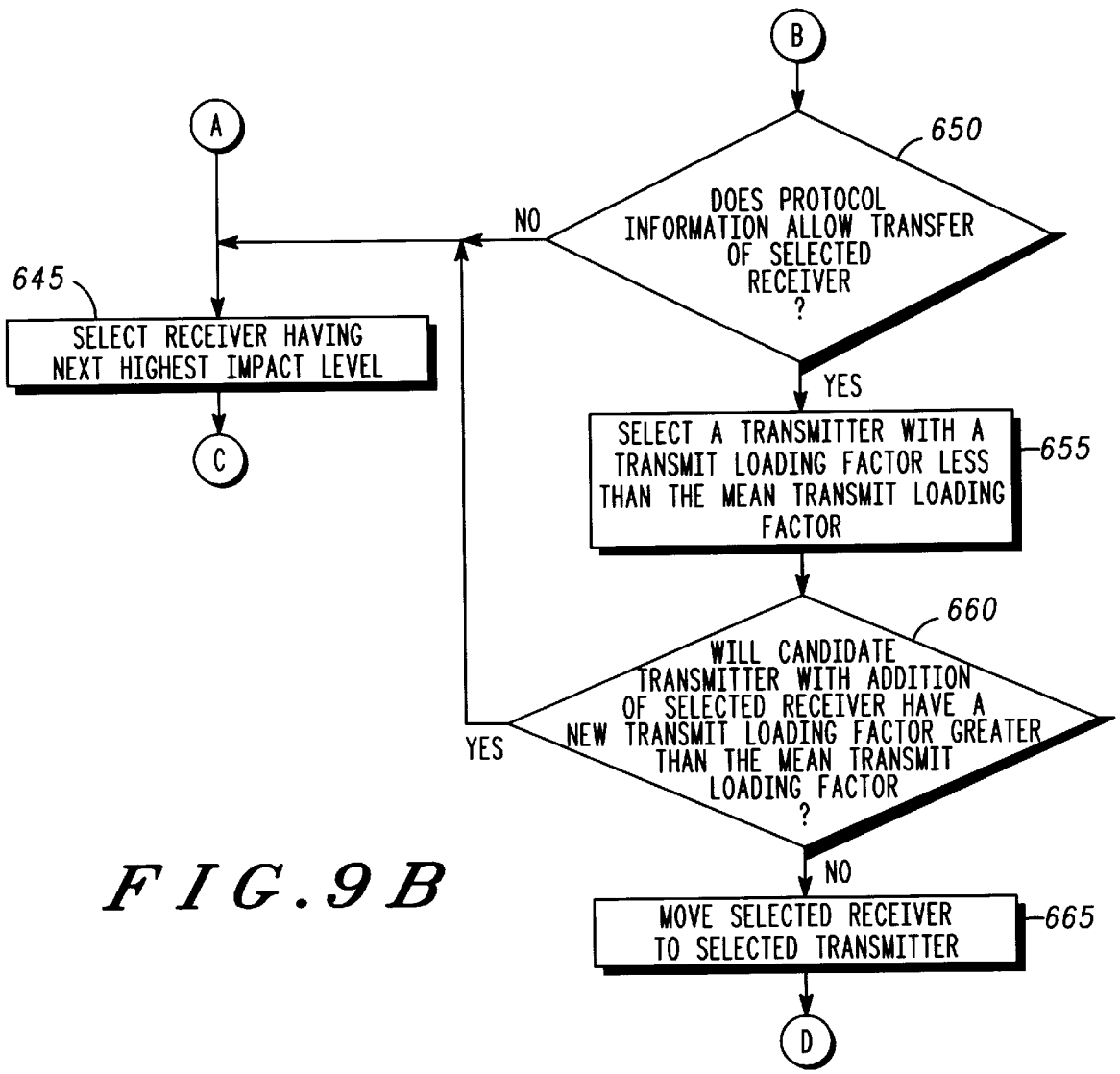

FIG. 9 is a flow chart illustrating downstream channel loading for active secondary stations of the communication system in accordance with the present invention. In parallel with the methodology discussed above with reference to FIG. 8, in accordance with this portion of the spectrum management method, if a transmitter of a primary station is comparatively overloaded, namely, having too many active secondary stations receiving on a downstream channel, some of the secondary stations will be transferred to other, less loaded primary station transmitters (operating on other downstream channels). Referring to FIG. 9, beginning with start step 600, transmit loading factors are determined for each primary station transmitter $136_n$, step 605, until transmit loading factors have been determined for all transmitters 136 of a primary station 101, step 610. When these determinations may have been made during steps 405–425 discussed above, this portion of the spectrum management method may also directly proceed beginning with step 615. In step 615, the variation in the transmit loading factors (for all primary station transmitters) is determined. If the variation in transmit loading factors is not greater than a predetermined (or adaptive) threshold, step 620, indicating that all primary station transmitters have similar loading within a particular range (or variance), then no further adjustments need to be made with regard to the downstream channel loading for active secondary devices, and this iteration of the downstream channel loading portion of the spectrum management method may terminate, return step 670. If the variation in transmit loading factors is greater than a predetermined (or adaptive) threshold in step 620, indicating that all primary station transmitters do not have similar loading within a particular range (or variance), then primary station transmitters (of the plurality of primary station transmitters 136) are selected which have transmit loading factors which are greater than the mean transmit loading factor, step 625. Secondary station receivers will then be transferred from heavily loaded primary station transmitters to more lightly loaded primary station transmitters, depending upon various conditions. For example, only secondary station receivers which would have an impact if transferred, namely, decreasing the transmit loading factor for the given primary station transmitter, will be transferred, provided that the transfer does not result in overloading yet another primary station transmitter. Moreover, to avoid excessive service disruptions, excessive transfers of secondary station receivers (and transmitters) should also be avoided.

As a consequence, in step 630, for the primary station transmitter having the highest transmit loading factor, an impact level of a transfer, for each corresponding receiver (of the secondary stations), is determined. For example, a transfer of a secondary station receiver which is receiving very little information on a downstream channel may have a negligible impact on decreasing the transmit loading factor of the selected primary station transmitter and, therefore, little would be gained by transferring the secondary station receiver. Next, in step 635, the secondary station receiver having the highest impact level, if transferred, is selected. To avoid transferring the same secondary station receiver an excessive number of times, with concomitant potential service disruption, in step 640, if the historical information for the selected secondary station receiver is greater than a predetermined or adaptive threshold, e.g., the selected secondary station receiver has already been transferred recently, then another (second) secondary station receiver having the next highest impact level is selected, step 645. The second secondary station receiver having the next highest impact level is also evaluated for possible transfer, returning to step 640. If in step 640 the historical information for the selected secondary station receiver is not greater than the predetermined or adaptive threshold, e.g., the selected secondary station receiver has not been transferred recently, then the selected secondary station receiver is evaluated to determine whether protocol information indicates that a transfer of the selected secondary station receiver would be allowable, step 650. For example, protocol information may indicate that because the particular secondary station (having the receiver) is or is about to become heavily involved in a particular application, such as a downstream file transfer, this secondary station may not be a good candidate for downstream channel transfer. Accordingly, if such protocol information indicates that a transfer of the selected receiver of the secondary station would be inadvisable in step 650, another secondary station receiver (having the next highest impact level if transferred) is selected, returning to step 645.

Continuing to refer to FIG. 9, if the protocol information indicates that a transfer of the selected secondary station receiver would be allowable in step 650, then a second primary station transmitter, having a transmit loading factor less than the mean transmit loading factor, is selected in the primary station (or in another primary station servicing the same secondary station), step 655, for evaluation as a candidate primary station transmitter (to which a secondary station receiver from the selected, heavily loaded primary station transmitter may be transferred) (step 660). In the preferred embodiment, the primary station transmitter having the smallest transmit loading factor is selected. Other information may also be pertinent to the selection of a candidate primary station transmitter; for example, historical information, such as error rate and noise levels, may indicate that additional secondary station receivers should not be transferred to the candidate primary station transmitter, or an excessively high error rate may result. In step 660, if the candidate primary station transmitter would, with the proposed transfer (i.e., with the additional impact of the selected secondary station receiver), have a new transmit loading factor which is still less than (or equal to) the mean transmit loading factor, then the selected secondary station receiver may be transferred to this candidate primary station transmitter, step 665. Following such a transfer in step 665, the process may be repeated, returning to step 615, to continue to balance the downstream channel loading across all the transmitters of the primary stations. In step 660, however, if the candidate primary station transmitter would, with the proposed transfer (i.e., with the additional impact of the selected secondary station receiver), have a new transmit loading factor which is greater than the mean transmit loading factor, potentially overloading the candidate primary station transmitter, then the selected secondary station receiver should probably not be transferred to this candidate primary station transmitter. Protocol information and other predictive information may also indicate, in step 660, that a transfer may be ill advised because, while the candidate primary station transmitter may currently (with the additional impact of the selected secondary station receiver) have a transmit loading factor less than the mean, anticipated traffic (based upon protocol information) may indicate that the transmit loading factor soon will be greater than the mean, and the selected secondary station receiver should probably not be transferred. In these cases, when the selected secondary station receiver should probably not be transferred to this candidate primary station transmitter in step 660, the method may proceed to step 645, to select another (second or third) secondary station receiver having the next highest impact level for evaluation for possible transfer. Alternatively, if the primary station transmitter having the smallest transmit loading factor was not already selected in step 655 and evaluated in step 660, then the method may select another (second) candidate primary station transmitter for evaluation for possible transfer of the selected secondary station receiver, returning to step 655. As may be apparent from the above discussion, as this portion of the spectrum management process continues to iterate, receivers of secondary stations will be transferred from heavily loaded primary station transmitters to less loaded primary station transmitters, resulting in transmit loading factors moving toward the mean and load balancing across downstream channels.

Figure 10A:
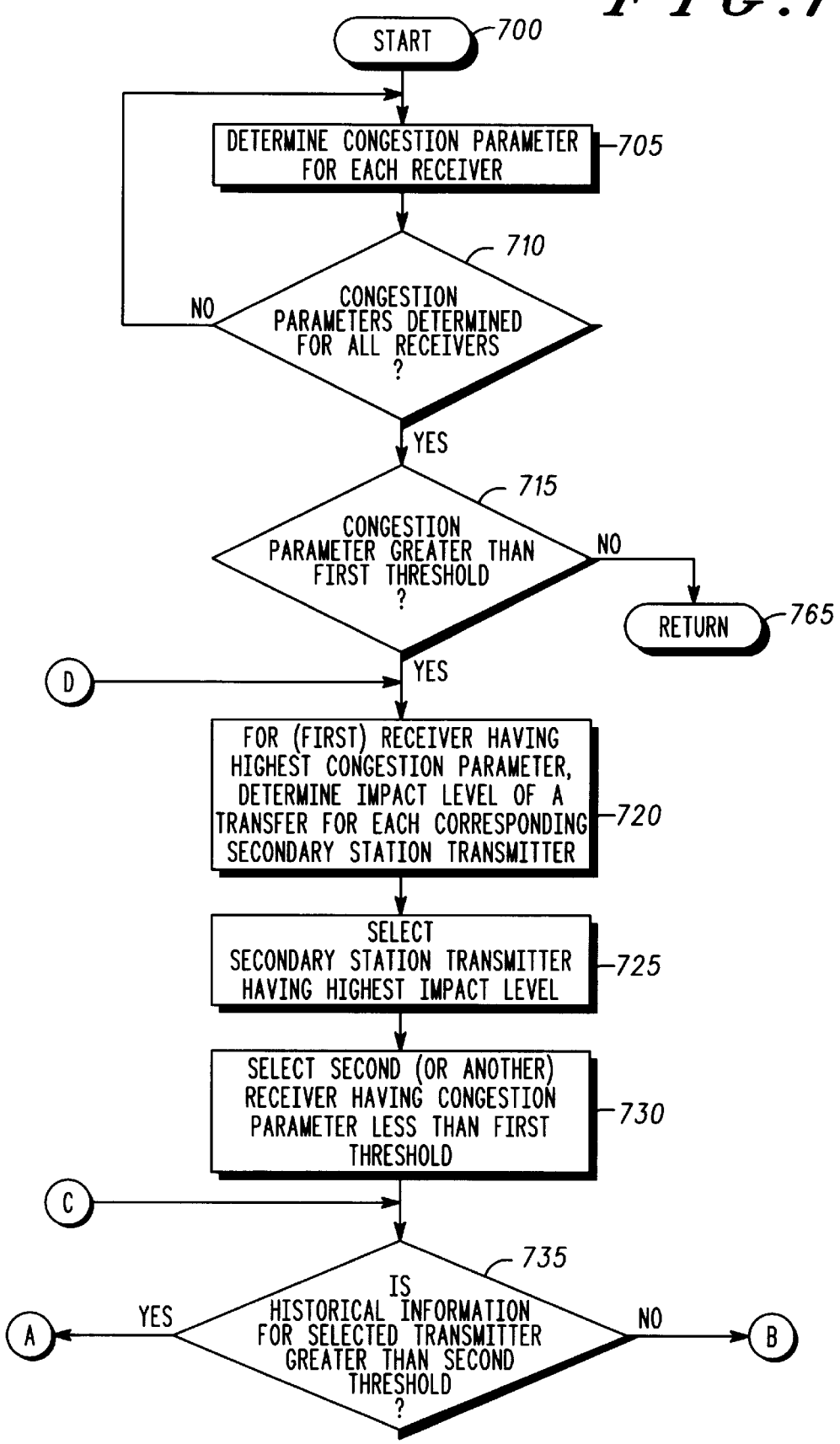
FIG. 10 is a flow chart illustrating upstream congestion management for active secondary devices of the communication system in accordance with the present invention.
Figure 10B:
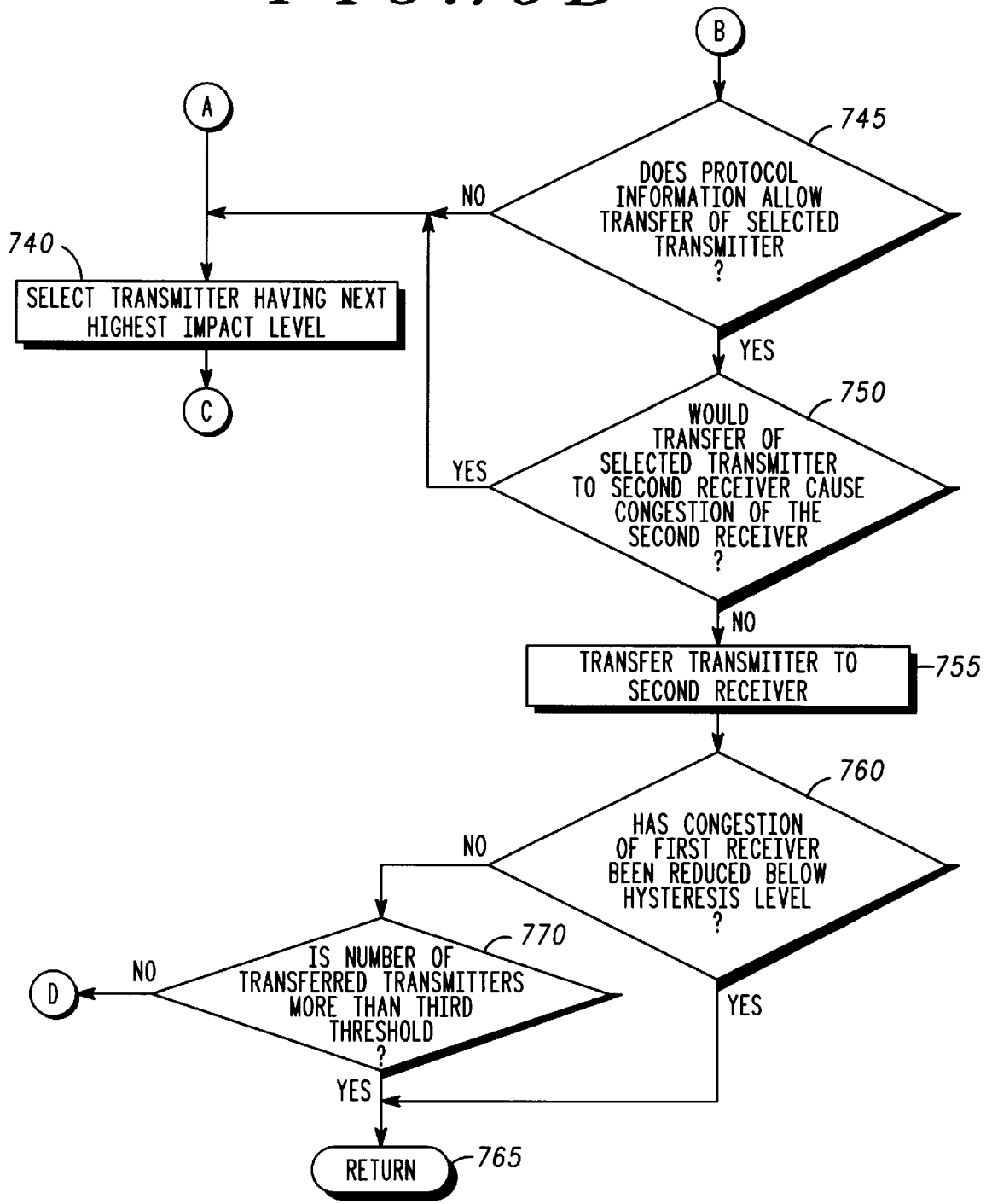

FIG. 10 is a flow chart illustrating upstream congestion management for active secondary devices 110 of the communication system 100 in accordance with the present invention. While related to upstream channel allocation and loading illustrated in FIGS. 4, 6 and 8, upstream congestion management concerns additional factors and additional circumstances which affect system performance. While the upstream channel allocation portion of the spectrum management methodology of FIGS. 6 and 8 focused upon a receive (upstream) loading factor, formed by parameters such as the cycle time to reach all active secondary devices in a polling protocol, the upstream congestion management portion of the spectrum management methodology concerns a broader and more inclusive congestion parameter. In the preferred embodiment, the congestion parameter for upstream congestion management is an access latency factor, while in other embodiments, the congestion parameter may include, for example, factors or measurements of data throughput, the number of data collisions, or the various receive loading factors such as cycle time and packet and bit rates. In addition to the access latency experienced by polled secondary stations, referred to more specifically as cycle time, the access latency factor as a congestion parameter includes delays which may be experienced by any and all secondary stations, including those which may be initiating communication with the system utilizing a contention access protocol or hybrid contention/polling protocol. For example, congestion may occur when many secondary stations are transmitting upstream, creating collisions of messages to which the primary station should respond. If an excessive number of such collisions have occurred, any given secondary station may be unable to gain access to the communication system 100 within a reasonable or acceptable period of time, resulting in excessive or unacceptable access latency.

Referring to FIG. 10, beginning with start step 700, a congestion parameter (preferably an access latency factor) is determined for each primary station receiver $135_n$, step 705, until congestion parameters have been determined for all receivers 135 of the primary station 101, step 710. Next, in step 715, if none of the plurality of congestion parameters obtained in steps 705 and 710 are greater than a predetermined threshold or an adaptive threshold, indicating that all primary station receivers have acceptable congestion parameters and are not experiencing upstream congestion, then no further adjustments need to be made with regard to the upstream congestion management of secondary stations, and this iteration of the upstream congestion management portion of the spectrum management method may terminate, return step 765. In step 715, however, if any of the plurality of congestion parameters obtained in steps 705 and 710 are greater than a predetermined threshold or an adaptive threshold, indicating that one or more primary station receivers have unacceptable congestion parameters (such as access latency factors) and are experiencing congestion, then a primary station receiver (of the plurality of primary station receivers 135) is selected which has the highest congestion parameter, and impact levels of all its corresponding secondary station transmitters are determined, step 720. As in the upstream load balancing portion of the spectrum management method illustrated in FIG. 8, secondary station transmitters will then be transferred from congested primary station receivers to more lightly loaded, non-congested primary station receivers, depending upon various conditions. For example, only secondary station transmitters which would have an impact if transferred, namely, decreasing the congestion parameter for the given primary station receiver, will be transferred, provided that the transfer does not result in creating congestion for yet another primary station receiver. Moreover, to avoid excessive service disruptions, excessive transfers of secondary device transmitters should also be avoided. As a consequence, referring to FIG. 10, in step 720, for the primary station receiver having the highest congestion parameter, the impact level of a transfer, for each corresponding transmitter (of the secondary stations), is determined. Next, in step 725, the secondary station transmitter having the highest impact level, if transferred, is selected. In step 730, another (or second) receiver of a primary station, which has a congestion parameter less than the predetermined (or adaptive) threshold, is selected as a candidate to which the selected secondary station transmitter may be transferred. In the preferred embodiment, the second primary station receiver having the lowest congestion parameter (i.e., having the least congestion) is selected. As discussed above, to avoid transferring the same secondary station transmitter an excessive number of times, with concomitant potential service disruption, in step 735, if the historical information for the selected secondary station transmitter is greater than a predetermined or adaptive threshold, e.g., the selected secondary station transmitter has already been transferred recently, then another (second) secondary station transmitter having the next highest impact level is selected, step 740. The second secondary station transmitter having the next highest impact level is also evaluated for possible transfer, returning to step 735. If in step 735 the historical information for the selected secondary station transmitter is not greater than the predetermined or adaptive threshold, e.g., the selected secondary station transmitter has not been transferred recently, then the selected secondary station transmitter is evaluated to determine whether protocol information indicates that a transfer of the selected secondary station transmitter would be allowable, step 745, as discussed above for step 550. If such protocol information indicates that a transfer of the selected transmitter of the secondary station would be inadvisable in step 745, another secondary station transmitter (having the next highest impact level if transferred) is selected, returning to step 740.

Continuing to refer to FIG. 10, if the protocol information indicates that a transfer of the selected secondary station transmitter would be allowable in step 745, then potential congestion of the second primary station receiver is evaluated in step 750. If, in step 750, the transfer of the selected secondary station transmitter to the second primary station receiver would cause the second primary station receiver to become congested and potentially overloaded (having an congestion parameter greater than the predetermined (or adaptive) threshold), then another secondary station transmitter is selected for possible transfer, returning to step 740. Alternatively, if the primary station receiver selected in step 730 was not the primary station receiver having the lowest congestion parameter, then yet another (third) receiver of the primary station, having an congestion parameter less than the threshold, may be selected, returning to step 730. In step 750, if the candidate primary station receiver would, with the proposed transfer (i.e., with the additional impact of the selected secondary station transmitter), have a new congestion parameter which is still less than (or equal to) the predetermined (or adaptive) threshold, then the selected secondary station transmitter may be transferred to this candidate primary station receiver, step 755. Next, in step 760, the first primary station receiver (previously having the highest congestion parameter), is evaluated to determine whether its current congestion parameter has been reduced below a second predetermined (or adaptive) threshold. In the preferred embodiment, this second threshold is a hysteresis level, namely, is less than the first threshold (of step 715), such that the first primary station receiver does not immediately become congested again. If the congestion parameter of this (first) primary station receiver has at least been reduced to the hysteresis (or second) threshold, in step 760, then no further congestion reduction is needed for this (first) primary station receiver, and this iteration of the congestion management portion of the spectrum management method may terminate, return step 765. If the congestion parameter of this (first) primary station receiver has not been reduced to the hysteresis (or second) threshold, in step 760, then the process will be repeated, returning to step 720, provided that the number of secondary station transmitters moved from the upstream channel of this primary station receiver is not excessive (with corresponding service disruptions), step 770. If the number of secondary station transmitters moved from the upstream channel of this primary station receiver is below a predetermined (or adaptive) threshold in step 770, then the process will be repeated (returning to step 720). If the number of secondary station transmitters moved from the upstream channel of this primary station receiver is greater than the predetermined (or adaptive) threshold in step 770, indicating that enough secondary station transmitters have been transferred during this iteration (and additional transfers may tend to cause service disruptions), then this iteration of the congestion management portion of the spectrum management method may terminate, return step 765. The congestion management process may also be repeated for additional primary station receivers which may be congested, returning to step 705. As may be apparent from the above discussion, as this portion of the spectrum management process continues to iterate, transmitters of secondary stations will be transferred from heavily loaded, congested primary station receivers to less loaded primary station receivers, resulting in improved congestion parameters, less overall communication system congestion, and improved upstream transmission performance.

Figure 11A:
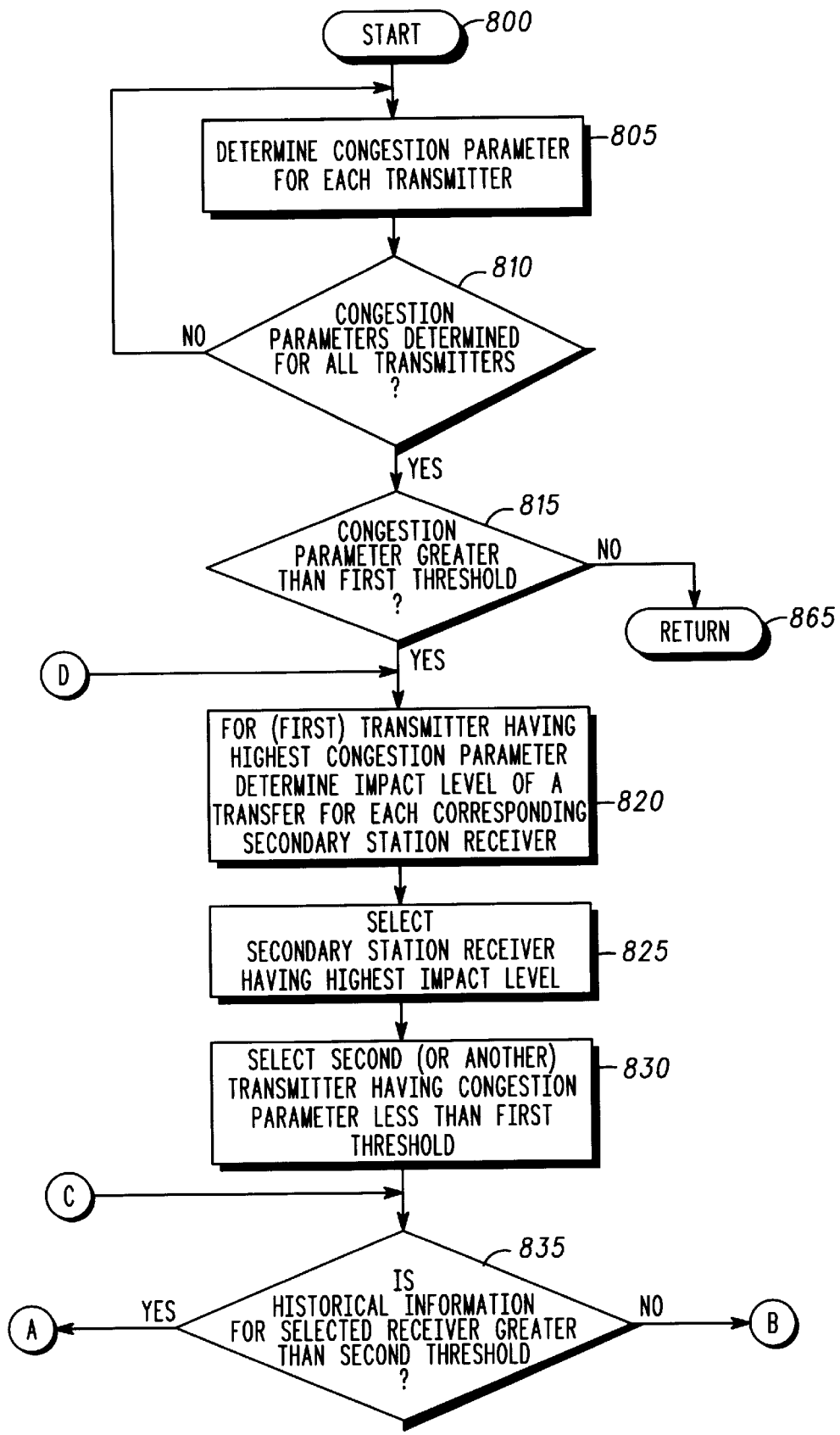
FIG. 11 is a flow chart illustrating downstream congestion management for active secondary devices of the communication system in accordance with the present invention.
Figure 11B:
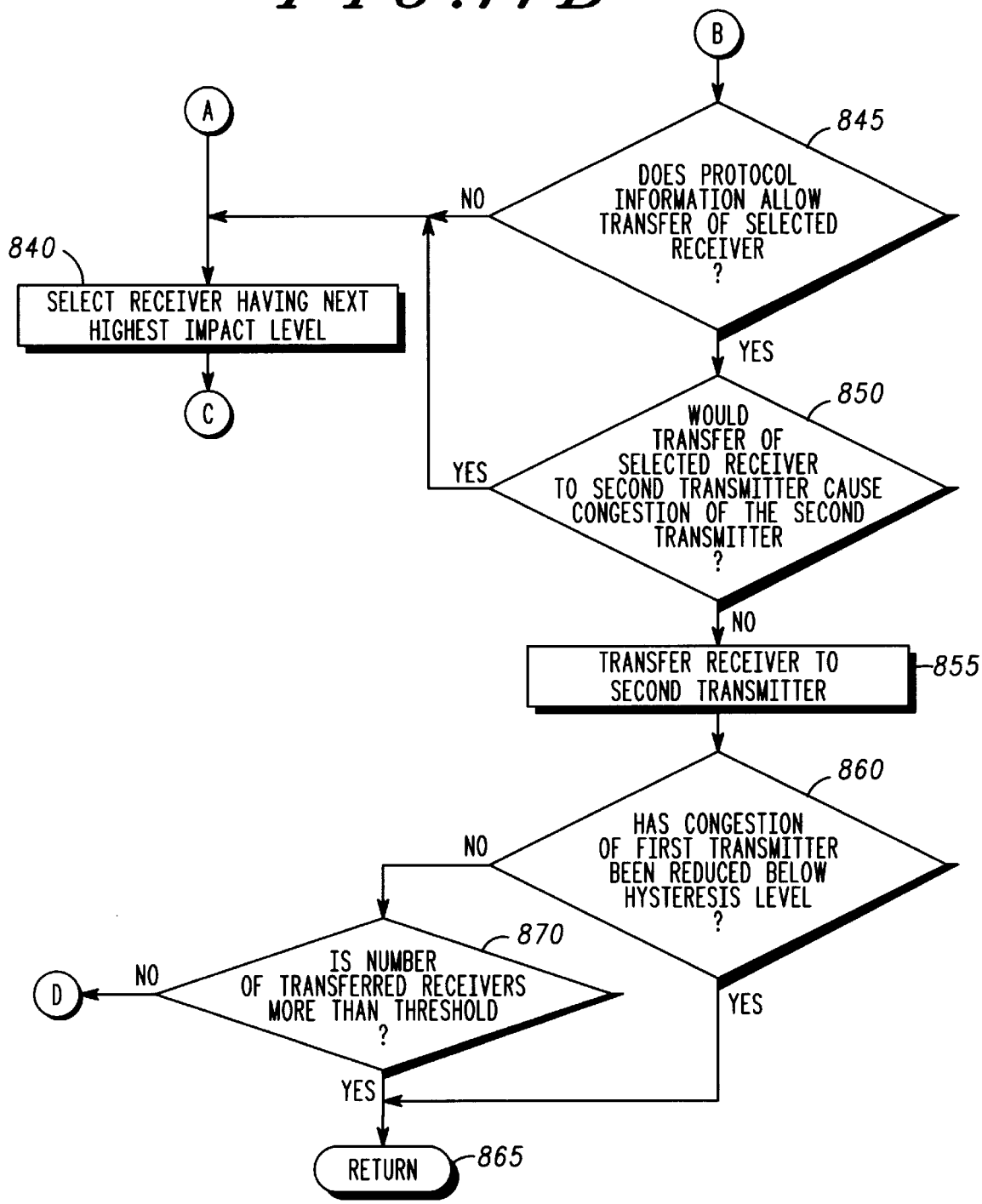

FIG. 11 is a flow chart illustrating downstream congestion management for active secondary devices 110 of the communication system 100 in accordance with the present invention. While related to downstream channel allocation and loading illustrated in FIGS. 5, 7 and 9, downstream congestion management concerns additional factors and additional circumstances which may affect system performance. While the downstream channel allocation portion of the spectrum management methodology of FIGS. 8 and 10 focused upon a transmit (downstream) loading factor, formed by parameters such as the queue depth, the downstream congestion management portion of the spectrum management methodology concerns a broader congestion parameter, both for the particular downstream channel and for each secondary station connected to the primary station. In the preferred embodiment, this congestion parameter, for downstream congestion management, is a throughput factor. In other embodiments, the congestion parameter may also include the various transmit loading factors such as queue depth and packet and bit rates. For a downstream channel, a very high congestion parameter such as throughput tends to indicate high levels of activity by secondary station receivers, which may be better serviced through utilization of other downstream channels (and corresponding primary station transmitters) for those very active secondary stations. However, in the preferred embodiment, transfer of a secondary station receiver to another downstream channel may have greater disruption to a secondary station, such as delay, compared to transfer of a secondary station transmitter to another upstream channel (and corresponding primary station receiver). As a consequence, in the preferred embodiment, the smallest set of secondary station receivers needed to relieve downstream channel congestion (of primary station transmitters) is transferred to another downstream channel (and correspondingly to other primary station transmitters).

Referring to FIG. 11, beginning with start step 800, a congestion parameter is determined for each primary station transmitter $136_n$, step 805, until congestion parameters have been determined for all transmitters 136 of the primary station 101, step 810. Next, in step 815, if none of the plurality of congestion parameters obtained in steps 805 and 810 are greater than a predetermined threshold or an adaptive threshold, indicating that all primary station transmitters have acceptable congestion parameters and are not experiencing congestion, then no further adjustments need to be made with regard to the downstream congestion management of secondary devices, and this iteration of the downstream congestion management portion of the spectrum management method may terminate, return step 865. In step 815, however, if any of the plurality of congestion parameters obtained in steps 805 and 810 are greater than a predetermined threshold or an adaptive threshold, indicating that one or more primary station transmitters have unacceptable congestion parameters and are experiencing congestion, then a primary station transmitter (of the plurality of primary station transmitters 136) is selected which has the highest congestion parameter, and impact levels of all its corresponding secondary station receivers are determined, step 820. As in the downstream load balancing portion of the spectrum management method illustrated in FIG. 9, secondary station receivers will then be transferred from congested primary station transmitters to more lightly loaded, non-congested primary station transmitters, depending upon various conditions. For example, only secondary station receivers which would have an impact if transferred, namely, decreasing the congestion parameter for the given primary station transmitter, will be transferred, provided that the transfer does not result in creating congestion for yet another primary station transmitter. Moreover, as indicated above, to avoid excessive service disruptions, excessive transfers of secondary device receivers (and transmitters) should also be avoided. As a consequence, referring to FIG. 11, in step 820, for the primary station transmitter having the highest congestion parameter, the impact level of a transfer, for each corresponding receiver (of the secondary stations), is determined. Next, in step 825, the secondary station receiver having the highest impact level, if transferred, is selected. In step 830, another (or second) transmitter of a primary station, which has a congestion parameter less than the predetermined (or adaptive) threshold, is selected as a candidate to which the selected secondary station receiver may be transferred. In the preferred embodiment, the second primary station transmitter having the lowest congestion parameter (i.e., is the least congested) is selected. As discussed above, to avoid transferring the same secondary station receiver an excessive number of times, with concomitant potential service disruption, in step 835, if the historical information for the selected secondary station receiver is greater than a predetermined or adaptive threshold, e.g., the selected secondary station receiver has already been transferred recently, then another (second) secondary station receiver having the next highest impact level is selected, step 840. The second secondary station receiver having the next highest impact level is also evaluated for possible transfer, returning to step 835. If in step 835 the historical information for the selected secondary station receiver is not greater than the predetermined or adaptive threshold, e.g., the selected secondary station receiver has not been transferred recently, then the selected secondary station receiver is evaluated to determine whether protocol information indicates that a transfer of the selected secondary station receiver would be allowable, step 845, as discussed above for step 650. If such protocol information indicates that a transfer of the selected receiver of the secondary station would be inadvisable in step 845, another secondary station receiver (having the next highest impact level if transferred) is selected, returning to step 840.

If the protocol information indicates that a transfer of the selected secondary station receiver would be allowable in step 845, then potential congestion of the second, candidate transmitter (of the primary station) is evaluated in step 850. If, in step 850, the transfer of the selected secondary station receiver to the second primary station transmitter would cause the second primary station transmitter to become congested and potentially overloaded (having a congestion parameter greater than the predetermined (or adaptive) threshold), then another secondary station receiver is selected for possible transfer, returning to step 840. Alternatively, if the primary station transmitter selected in step 830 was not the transmitter having the lowest congestion parameter, then yet another (third) primary station transmitter of the primary station, having a congestion parameter less than the threshold, may be selected, returning to step 830. In step 850, if the candidate primary station transmitter would, with the proposed transfer (i.e., with the additional impact of the selected secondary station receiver), have a new congestion parameter which is still less than (or equal to) the predetermined (or adaptive) threshold, then the selected secondary station receiver may be transferred to this candidate primary station transmitter, step 855. Next, in step 860, the first primary station transmitter (previously having the highest congestion parameter), is evaluated to determine whether its current congestion parameter has been reduced below a second predetermined (or adaptive) threshold. In the preferred embodiment, this second threshold is also a hysteresis level, namely, is less than the first threshold (of step 815), such that the first primary station transmitter does not immediately become congested again. If the congestion parameter of this (first) primary station transmitter has at least been reduced to the hysteresis (or second) threshold, in step 860, then no further congestion reduction is needed for this (first) primary station transmitter, and this iteration of the downstream congestion management portion of the spectrum management method may terminate, return step 865. If the congestion parameter of this (first) primary station transmitter has not been reduced to the hysteresis (or second) threshold, in step 860, then the process will be repeated, returning to step 820, provided that the number of secondary station receivers moved from the downstream channels of this primary station transmitter is not excessive (with corresponding service disruptions), step 870. If the number of secondary station receivers moved from the downstream channels of this primary station transmitter is below a predetermined (or adaptive) threshold in step 870, then the process will be repeated (returning to step 820). If the number of secondary station receivers moved from the downstream channels of this primary station transmitter is greater than the predetermined (or adaptive) threshold in step 870, indicating that enough secondary station receivers have been transferred during this iteration (and additional transfers may tend to cause service disruptions), then this iteration of the downstream congestion management portion of the spectrum management method may terminate, return step 865. The downstream congestion management process may also be repeated for additional transmitters of a primary station which may be congested, returning to step 805. Also as may be apparent from the above discussion, as this portion of the spectrum management process continues to iterate, receivers of secondary stations will be transferred from heavily loaded, congested primary station transmitters to less loaded primary station transmitters, resulting in improved congestion parameters, less overall communication system congestion, and improved downstream transmission performance.

Figure 12:
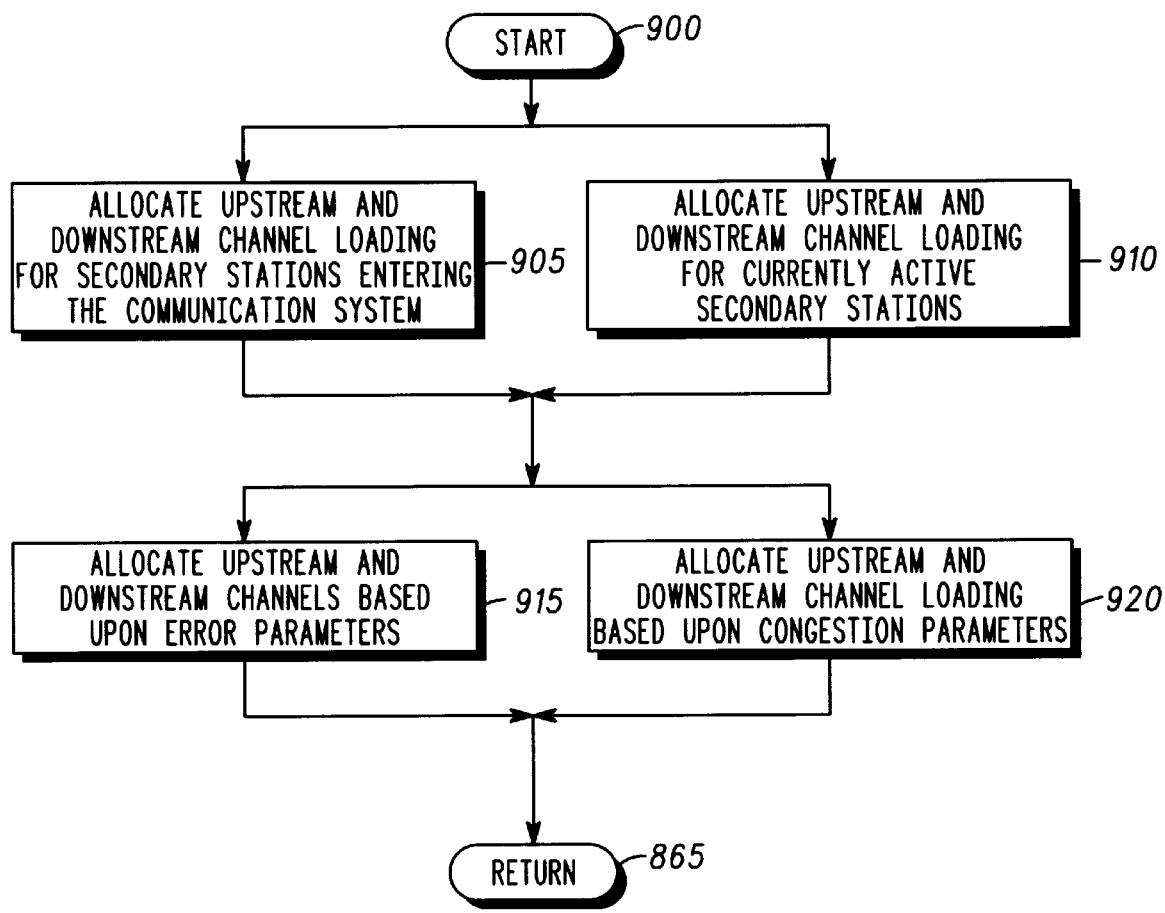
FIG. 12 is a flow chart illustrating upstream and downstream spectrum management in accordance with the present invention.

FIG. 12 is a flow chart illustrating upstream and downstream spectrum management in accordance with the present invention. Beginning with start step 900, upstream and downstream channel loading is allocated for secondary stations which are entering the communication system 100, step 905, as discussed in detail above and as illustrated in FIGS. 6 and 7. Next or concurrently with step 905, upstream and downstream channel loading is allocated for secondary stations which are and have been active in the communication system 100, step 910, also as discussed in detail above and as illustrated in FIGS. 8 and 9. Next, in step 915, upstream and downstream channels are allocated based upon error parameters, as discussed in detail above and as illustrated in FIGS. 4 and 5. Lastly, in step 920, upstream and downstream channels are allocated based upon congestion parameters, as discussed in detail above and as illustrated in FIGS. 10 and 11. Steps 915 and 920 may be concurrent with each other, and may also be concurrent with either or both steps 905 and 910. Following steps 915 and 920, the iteration of the spectrum management process may end, return step 925, or may continue and repeat, as in the preferred embodiment, returning to steps 905 and 910.

In summary, FIG. 2 in light of FIG. 12 illustrates an apparatus 101 for spectrum management in a communication system, with the communication system having a communication medium, with the communication medium having a plurality of downstream communication channels, the communication medium further having a plurality of upstream communication channels, with the communication system further having a plurality of secondary stations coupleable to the communication medium, and with each secondary station of the plurality of secondary stations having a receiver and a transmitter. The apparatus 101 then comprises: first, a channel interface $125_n$ coupleable to the communication medium for signal transmission on a downstream communication channel of the plurality of downstream communication channels and for signal reception on an upstream communication channel of the plurality of upstream communication channels; and second, a processor arrangement 120 coupled to the channel interface $125_n$, the processor arrangement 120 responsive through a set of program instructions to allocate loading of the plurality of upstream communication channels and of the plurality of downstream communication channels for an entering secondary station of the plurality of secondary stations; to allocate loading of the plurality of upstream communication channels and of the plurality of downstream communication channels for an active secondary station of the plurality of secondary stations; to allocate the plurality of upstream communication channels and the plurality of downstream communication channels based upon an, error parameter; and to allocate loading of the plurality of upstream communication channels and of the plurality of downstream communication channels based upon a congestion parameter.

In summary, FIG. 2 in light of FIG. 4 illustrates an apparatus 101 wherein the processor arrangement 120 is further responsive: first, to monitor an error rate for each upstream communication channel of the plurality of upstream communication channels; to determine whether the error rate for each upstream communication channel of the plurality of upstream communication channels exceeds a first threshold to form a set of upstream high error channels; second, to determine a channel noise parameter for a first upstream high error channel of the set of upstream high error channels; third, when the channel noise parameter of the first upstream high error channel exceeds a second threshold, to transfer a secondary station transmitter from the first upstream high error channel to a first idle upstream communication channel of the plurality of upstream communication channels, the first idle upstream communication channel then having a channel noise parameter lower than the second threshold; and fourth, when the channel noise parameter of the first upstream high error channel is less than the second threshold, to transfer a secondary station transmitter from the first upstream high error channel to a second idle upstream communication channel of the plurality of upstream communication channels, the second idle upstream communication channel having a frequency higher than a frequency of the first upstream high error channel. As discussed above, any of the thresholds of the preferred embodiment, such as the first threshold and the second threshold of FIG. 4, may be either predetermined or adaptive. In the preferred embodiment, the channel noise parameter is the received signal strength measured when a high error channel of the plurality of high error channels is idle.

In summary, FIG. 2 in light of FIG. 5 illustrates an apparatus 101 wherein the processor arrangement is further responsive: first, to monitor a downstream error rate for each secondary station connected to a first downstream communication channel of the plurality of downstream communication channels; and second, when a predetermined number of the plurality of secondary stations have a downstream error rate which exceeds a threshold, to transfer a secondary station receiver from the first downstream communication channel to a second downstream communication channel of the plurality of downstream communication channels.

Also in summary, FIG. 2 in light of FIG. 6 illustrates an apparatus 101 wherein the processor arrangement 120 is further responsive: first, to determine a receive loading factor for each receiver of a plurality of primary station receivers to form a plurality of receive loading factors; second, when the plurality of receive loading factors indicate initialization of the communication system, to sequentially assign a transmitter of each secondary station transmitter of the plurality of secondary stations to each receiver of the plurality of primary station receivers; and third, when the plurality of receive loading factors do not indicate initialization of the communication system, to assign a transmitter of an entering secondary station of the plurality of secondary stations to a receiver of the plurality of primary station receivers then having a lowest receive loading factor.

Also in summary, FIG. 2 in light of FIG. 7 illustrates an apparatus 101 wherein the processor arrangement 120 is further responsive: first, to determine a transmit loading factor for each transmitter of a plurality of primary station transmitters to form a plurality of transmit loading factors; second, when the plurality of transmit loading factors indicate initialization of the communication system, to sequentially assign a receiver of each secondary station of the plurality of secondary stations to each transmitter of the plurality of primary station transmitters; and third, when the plurality of transmit loading factors do not indicate initialization of the communication system, to assign a receiver of an entering secondary station of the plurality of secondary stations to a transmitter of the plurality of primary station transmitters then having a lowest transmit loading factor.

Also in summary, FIG. 2 in light of FIG. 8 illustrates an apparatus 101 wherein the processor arrangement 120 is further responsive: first, to determine a receive loading factor for each receiver of a plurality of primary station receivers to form a plurality of receive loading factors; second, when a variation of the plurality of receive loading factors exceeds a threshold, to select a first receiver of the plurality of primary station receivers then having a highest receive loading factor; third, for the first receiver, to determine an impact level of a transfer for each corresponding secondary station transmitter of the plurality of secondary stations and selecting a secondary station transmitter of the plurality of secondary stations then having a highest impact level to form a selected transmitter; fourth, to select a second receiver of the plurality of primary station receivers then having a receive loading factor less than a mean receive loading factor and to determine a second receive loading factor for the second receiver in conjunction with the selected transmitter; and fifth, when the second receive loading factor is less than the mean receive loading factor, to transfer the selected transmitter to the second receiver. In the preferred embodiment, the receive loading factor further comprises a weighted combination of a packet rate, a bit rate, and a cycle time.

Also in summary, FIG. 2 in light of FIG. 9 illustrates an apparatus 101 wherein the processor arrangement 120 is further responsive:

first, to determine a transmit loading factor for each transmitter of a plurality of primary station transmitters to form a plurality of transmit loading factors; second, when a variation of the plurality of transmit loading factors exceeds a threshold, to select a first transmitter of the plurality of primary station transmitters then having a highest transmit loading factor; third, for the first transmitter, to determine an impact level of a transfer for each corresponding secondary station receiver of the plurality of secondary stations and to select the secondary station receiver of the plurality of secondary stations then having a highest impact level to form a selected receiver; fourth, to select a second transmitter of the plurality of primary station transmitters then having a transmit loading factor less than a mean transmit loading factor and to determine a second transmit loading factor for the selected transmitter in conjunction with the second receiver; and fifth, when the second transmit loading factor is less than the mean transmit loading factor, to transfer the selected receiver to the second transmitter. In the preferred embodiment, the transmit loading factor further comprises a weighted combination of a packet rate, a bit rate, and a queue depth.

Also in summary, FIG. 2 in light of FIG. 10 illustrates an apparatus 101 wherein the processor arrangement 120 is further responsive: first, to determine a congestion parameter for each receiver of a plurality of primary station receivers to form a plurality of congestion parameters; second, when a congestion parameter of the plurality of congestion parameters exceeds a first threshold, to select a first receiver of the plurality of primary station receivers then having a highest congestion parameter; third, for the first receiver, to determine an impact level of a transfer for each corresponding secondary station transmitter of the plurality of secondary stations and to select a secondary station transmitter of the plurality of secondary stations then having a highest impact level to form a selected transmitter; fourth, to select a second receiver of the plurality of primary station receivers then having a congestion parameter less than the first threshold and to determine a second congestion parameter for the second receiver in conjunction with the selected transmitter; and fifth, when the second congestion parameter is less than the first threshold, to transfer the selected transmitter to the second receiver. In the preferred embodiment, the congestion parameter is an access latency factor.

Lastly in summary, FIG. 2 in light of FIG. 11 illustrates an apparatus 101 wherein the processor arrangement 120 is further responsive: first, to determine a congestion parameter for each transmitter of a plurality of primary station transmitters to form a plurality of congestion parameters; second, when a congestion parameter of the plurality of congestion parameters exceeds a first threshold, to select a first transmitter of the plurality of primary station transmitters then having a highest congestion parameter; third, for the first transmitter, to determine an impact level of a transfer for each corresponding secondary station receiver of the plurality of secondary stations and to select a secondary station receiver of the plurality of secondary stations then having a highest impact level to form a selected receiver; fourth, to select a second transmitter of the plurality of primary station transmitters then having a congestion parameter less than the first threshold and to determine a second congestion parameter for the second transmitter in conjunction with the selected receiver; and fifth, when the second congestion parameter is less than first threshold, to transfer the selected receiver to the second transmitter. In the preferred embodiment, the congestion parameter further comprises a throughput factor.

Numerous advantages of the spectrum management apparatus and method of the present invention may be apparent. First, the spectrum management apparatus and method of the present invention addresses a completely new issue in data communications, namely, concurrent load balancing, congestion management, and channel assignment, in a multipoint communication system. Second, the spectrum management apparatus and method of the present invention provides a unique response to channel noise conditions, utilizing direct feedback from secondary stations, distinguishing impulse from ingress noise, and providing corresponding solutions. Next, the spectrum management apparatus and method of the present invention, uniquely provides for a minimal access latency, which is very significant in such an asymmetric communication system, as upstream access latency may negatively and severely impact downstream data throughput. Yet another advantage of the spectrum management apparatus and method of the present invention is the independent management of upstream and downstream channels, both for quality and for congestion, rather than the prior art approach of coupled upstream and downstream channel assignment and management. Lastly, the spectrum management apparatus and method of the present invention provides a needed methodology to integrate channel quality management with data traffic management, in one overall system.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method for spectrum management in a communication system, the communication system having a communication medium, the communication medium having a plurality of downstream communication channels, the communication medium further having a plurality of upstream communication channels, the communication system further having a plurality of secondary stations coupleable to the communication medium, each secondary station of the plurality of secondary stations having a receiver and a transmitter, the method comprising:

(a) allocating loading of the plurality of upstream communication channels and of the plurality of downstream communication channels for an entering secondary station of the plurality of secondary stations;

(b) allocating loading of the plurality of upstream communication channels and of the plurality of downstream communication channels for an active secondary station of the plurality of secondary stations;

(c) allocating the plurality of upstream communication channels and the plurality of downstream communication channels based upon an error parameter; and (d) allocating loading of the plurality of upstream communication channels and of the plurality of downstream communication channels based upon a congestion parameter.

2. The method of claim 1, further comprising:

(e) repeating steps (a) through (d), inclusive.

3. The method of claim 1 wherein step (c) further comprises:

(c1) monitoring an error rate for each upstream communication channel of the plurality of upstream communication channels;

(c2) determining whether the error rate for each upstream communication channel of the plurality of upstream communication channels exceeds a first threshold to form a set of upstream high error channels;

(c3) determining a channel noise parameter for a first upstream high error channel of the set of upstream high error channels;

(c4) when the channel noise parameter of the first upstream high error channel exceeds a second threshold, transferring a secondary station transmitter from the first upstream high error channel to a first idle upstream communication channel of the plurality of upstream communication channels, the first idle upstream communication channel then having a channel noise parameter lower than the second threshold; and (c5) when the channel noise parameter of the first upstream high error channel is less than the second threshold, transferring a secondary station transmitter from the first upstream high error channel to a second idle upstream communication channel of the plurality of upstream communication channels, the second idle upstream communication channel having a frequency higher than a frequency of the first upstream high error channel.

4. The method of claim 3, further comprising:

(c6) repeating steps (c3) through (c5), inclusive, for each high error channel of the plurality of high error channels.

5. The method of claim 3, further comprising:

(c7) repeating steps (c1) through (c6), inclusive.

6. The method of claim 3 wherein the first threshold and the second threshold are predetermined.

7. The method of claim 3 wherein the first threshold and the second threshold are adaptive.

8. The method of claim 3, wherein the channel noise parameter is the received signal strength measured when an upstream high error channel of the set of upstream high error channels is idle.

9. The method of claim 1 wherein step (c) further comprises:
   (c8) monitoring a downstream error rate for each secondary station of the plurality of secondary stations which is connected to a first downstream communication channel of the plurality of downstream communication channels; and
   (c9) when a predetermined number of the plurality of secondary stations have a downstream error rate which exceeds a threshold, transferring a secondary station receiver from the first downstream communication channel to a second downstream communication channel of the plurality of downstream communication channels.

10. The method of claim 9 wherein the third threshold is predetermined.

11. The method of claim 9 wherein the third threshold is adaptive.

12. The method of claim 1 wherein step (a) further comprises:
   (a1) determining a receive loading factor for each receiver of a plurality of primary station receivers to form a plurality of receive loading factors;
   (a2) when the plurality of receive loading factors indicate initialization of the communication system, sequentially assigning a transmitter of each secondary station of the plurality of secondary stations to each receiver of the plurality of primary station receivers; and
   (a3) when the plurality of receive loading factors do not indicate initialization of the communication system, assigning a transmitter of an entering secondary station of the plurality of secondary stations to a receiver of the plurality of primary station receivers then having a lowest receive loading factor.

13. The method of claim 1 wherein step (a) further comprises:
   (a4) determining a transmit loading factor for each transmitter of a plurality of primary station transmitters to form a plurality of transmit loading factors;
   (a5) when the plurality of transmit loading factors indicate initialization of the communication system, sequentially assigning a receiver of each secondary station of the plurality of secondary stations to each transmitter of the plurality of primary station transmitters; and
   (a6) when the plurality of transmit loading factors do not indicate initialization of the communication system, assigning a receiver of an entering secondary station of the plurality of secondary stations to a transmitter of the plurality of primary station transmitters then having a lowest transmit loading factor.

14. The method of claim 1 wherein step (b) further comprises:
   (b1) determining a receive loading factor for each receiver of a plurality of primary station receivers to form a plurality of receive loading factors;
   (b2) when a variation of the plurality of receive loading factors exceeds a threshold, selecting a first receiver of the plurality of primary station receivers then having a highest receive loading factor;
   (b3) for the first receiver, determining an impact level of a transfer for each corresponding secondary station transmitter of the plurality of secondary stations and selecting a secondary station transmitter of the plurality of secondary stations then having a highest impact level to form a selected transmitter;
   (b4) selecting a second receiver of the plurality of primary station receivers then having a receive loading factor less than a mean receive loading factor and determining a second receive loading factor for the selected receiver in conjunction with the selected transmitter; and
   (b5) when the second receive loading factor is less than the mean receive loading factor, transferring the selected transmitter to the second receiver.

15. The method of claim 14, wherein step (b3) further comprises:
   (b3i) determining whether communication system historical information precludes a potential transfer of the selected transmitter; and
   (b3ii) when communication system historical information precludes the potential transfer of the selected transmitter, selecting a secondary station transmitter of the plurality of secondary stations then having a next highest impact level to form the selected transmitter.

16. The method of claim 14, wherein step (b3) further comprises:
   (b3iii) determining whether communication system protocol information precludes a potential transfer of the selected transmitter; and
   (b3iv) when communication system protocol information precludes the potential transfer of the selected transmitter, selecting a secondary station transmitter of the plurality of secondary stations then having a next highest impact level to form the selected transmitter.

17. The method of claim 14 wherein the threshold is predetermined.

18. The method of claim 14 wherein the threshold is adaptive.

19. The method of claim 14 wherein the receive loading factor further comprises a weighted combination of a packet rate, a bit rate, and a cycle time.

20. The method of claim 1 wherein step (b) further comprises:
   (b6) determining a transmit loading factor for each transmitter of a plurality of primary station transmitters to form a plurality of transmit loading factors;
   (b7) when a variation of the plurality of transmit loading factors exceeds a threshold, selecting a first transmitter of the plurality of primary station transmitters then having a highest transmit loading factor;
   (b8) for the first transmitter, determining an impact level of a transfer for each corresponding secondary station receiver of the plurality of secondary stations and selecting a secondary station receiver of the plurality of secondary stations then having a highest impact level to form a selected receiver;
   (b9) selecting a second transmitter of the plurality of primary station transmitters then having a transmit loading factor less than a mean transmit loading factor and determining a second transmit loading factor for the second transmitter in conjunction with the selected receiver; and
   (b10) when the second transmit loading factor is less than the mean transmit loading factor, transferring the selected receiver to the second transmitter.

21. The method of claim 20, wherein step (b8) further comprises:
- (b8i) determining whether communication system historical information precludes a potential transfer of the selected receiver; and
- (b8ii) when communication system historical information precludes the potential transfer of the selected receiver, selecting a secondary station receiver of the plurality of secondary stations then having a next highest impact level to form the selected receiver.

22. The method of claim 20, wherein step (b8) further comprises:
- (b8iii) determining whether communication system protocol information precludes a potential transfer of the selected receiver; and
- (b8iv) when communication system protocol information precludes the potential transfer of the selected receiver, selecting a secondary station receiver of the plurality of secondary stations then having a next highest impact level to form the selected receiver.

23. The method of claim 20 wherein the threshold is predetermined.

24. The method of claim 20 wherein the threshold is adaptive.

25. The method of claim 20 wherein the transmit loading factor further comprises a weighted combination of a packet rate, a bit rate, and a queue depth.

26. The method of claim 1 wherein step (d) further comprises:
- (d1) determining a congestion parameter for each receiver of a plurality of primary station receivers to form a plurality of congestion parameters;
- (d2) when a congestion parameter of the plurality of congestion parameters exceeds a first threshold, selecting a first receiver of the plurality of primary station receivers then having a highest congestion parameter;
- (d3) for the first receiver, determining an impact level of a transfer for each corresponding secondary station transmitter of the plurality of secondary stations and selecting a secondary station transmitter of the plurality of secondary stations then having a highest impact level to form a selected transmitter;
- (d4) selecting a second receiver of the plurality of primary station receivers then having a congestion parameter less than the first threshold and determining a second congestion parameter for the second receiver in conjunction with the selected transmitter; and
- (d5) when the second congestion parameter is less than the first threshold, transferring the selected transmitter to the second receiver.

27. The method of claim 26, wherein step (d3) further comprises:
- (d3i) determining whether communication system historical information precludes a potential transfer of the selected transmitter; and
- (d3ii) when communication system historical information precludes the potential transfer of the selected transmitter, selecting a secondary station transmitter of the plurality of secondary stations then having a next highest impact level to form the selected transmitter.

28. The method of claim 26, wherein step (d3) further comprises:
- (d3iii) determining whether communication system protocol information precludes a potential transfer of the selected transmitter; and
- (d3iv) when communication system protocol information precludes the potential transfer of the selected transmitter, selecting a secondary station transmitter of the plurality of secondary stations then having a next highest impact level to form the selected transmitter.

29. The method of claim 26, further comprising:
- (d6) repeating steps (d3) through (d5), inclusive, until the congestion parameter of the first receiver has decreased below a hysteresis threshold.

30. The method of claim 29 wherein the first threshold and the hysteresis threshold are predetermined.

31. The method of claim 29 wherein the first threshold and the hysteresis threshold are adaptive.

32. The method of claim 26 wherein the congestion parameter is an access latency factor.

33. The method of claim 1 wherein step (d) further comprises:
- (d6) determining a congestion parameter for each transmitter of a plurality of primary station transmitters to form a plurality of congestion parameters;
- (d7) when a congestion parameter of the plurality of congestion parameters exceeds a first threshold, selecting a first transmitter of the plurality of primary station transmitters then having a highest congestion parameter;
- (d8) for the first transmitter, determining an impact level of a transfer for each corresponding secondary station receiver of the plurality of secondary stations and selecting a secondary station receiver of the plurality of secondary stations then having a highest impact level to form a selected receiver;
- (d9) selecting a second transmitter of the plurality of primary station transmitters then having a congestion parameter less than the first threshold and determining a second congestion parameter for the second transmitter in conjunction with the selected receiver; and
- (d10) when the second congestion parameter is less than first threshold, transferring the selected receiver to the second transmitter.

34. The method of claim 33, wherein step (d8) further comprises:
- (d8i) determining whether communication system historical information precludes a potential transfer of the selected receiver; and
- (d8ii) when communication system historical information precludes the potential transfer of the selected receiver, selecting a secondary station receiver of the plurality of secondary stations then having a next highest impact level to form the selected receiver.

35. The method of claim 33, wherein step (d8) further comprises:
- (d8iii) determining whether communication system protocol information precludes a potential transfer of the selected receiver; and
- (d8iv) when communication system protocol information precludes the potential transfer of the selected receiver, selecting a secondary station receiver of the plurality of secondary stations then having a next highest impact level to form the selected receiver.

36. The method of claim 33, further comprising:
- (d11) repeating steps (d8) through (d10), inclusive, until the congestion parameter of the first transmitter has decreased below a hysteresis threshold.

37. The method of claim 36 wherein the first threshold and the hysteresis threshold are predetermined.

38. The method of claim 36 wherein the first threshold and the hysteresis threshold are adaptive.

39. The method of claim 33 wherein the congestion parameter is a throughput factor.

40. An apparatus for spectrum management in a communication system, the communication system having a communication medium, the communication medium having a plurality of downstream communication channels, the communication medium further having a plurality of upstream communication channels, the communication system further having a plurality of secondary stations coupleable to the communication medium, each secondary station of the plurality of secondary stations having a receiver and a transmitter, the apparatus comprising:

a channel interface coupleable to the communication medium for signal transmission on a downstream communication channel of the plurality of downstream communication channels and for signal reception on an upstream communication channel of the plurality of upstream communication channels; and a processor arrangement coupled to the channel interface, the processor arrangement responsive through a set of program instructions to allocate loading of the plurality of upstream communication channels and of the plurality of downstream communication channels for an entering secondary station of the plurality of secondary stations; to allocate loading of the plurality of upstream communication channels and of the plurality of downstream communication channels for an active secondary station of the plurality of secondary stations; to allocate the plurality of upstream communication channels and the plurality of downstream communication channels based upon an error parameter; and to allocate loading of the plurality of upstream communication channels and of the plurality of downstream communication channels based upon a congestion parameter.

41. The apparatus of claim 40 wherein the processor arrangement is further responsive:

to monitor an error rate for each upstream communication channel of the plurality of upstream communication channels; to determine whether the error rate for each upstream communication channel of the plurality of upstream communication channels exceeds a first threshold to form a set of upstream high error channels;

to determine a channel noise parameter for a first upstream high error channel of the set of upstream high error channels;

when the channel noise parameter of the first upstream high error channel exceeds a second threshold, to transfer a secondary station transmitter from the first upstream high error channel to a first idle upstream communication channel of the plurality of upstream communication channels, the first idle upstream communication channel then having a channel noise parameter lower than the second threshold; and when the channel noise parameter of the first upstream high error channel is less than the second threshold, to transfer a secondary station transmitter from the first upstream high error channel to a second idle upstream communication channel of the plurality of upstream communication channels, the second idle upstream communication channel having a frequency higher than a frequency of the first upstream high error channel.

42. The apparatus of claim 41 wherein the first threshold and the second threshold are predetermined.

43. The apparatus of claim 41 wherein the first threshold and the second threshold are adaptive.

44. The apparatus of claim 41, wherein the channel noise parameter is the received signal strength measured when a high error channel of the plurality of high error channels is idle.

45. The apparatus of claim 40 wherein the processor arrangement is further responsive:

to monitor a downstream error rate for each secondary station connected to a first downstream communication channel of the plurality of downstream communication channels; and when a predetermined number of the plurality of secondary stations have a downstream error rate which exceeds a threshold, to transfer a secondary station receiver from the first downstream communication channel to a second downstream communication channel of the plurality of downstream communication channels.

46. The apparatus of claim 45 wherein the threshold is predetermined.

47. The apparatus of claim 45 wherein the threshold is adaptive.

48. The apparatus of claim 40 wherein the processor arrangement is further responsive:

to determine a receive loading factor for each receiver of a plurality of primary station receivers to form a plurality of receive loading factors;

when the plurality of receive loading factors indicate initialization of the communication system, to sequentially assign a transmitter of each secondary station transmitter of the plurality of secondary stations to each receiver of the plurality of primary station receivers; and when the plurality of receive loading factors do not indicate initialization of the communication system, to assign a transmitter of an entering secondary station of the plurality of secondary stations to a receiver of the plurality of primary station receivers then having a lowest receive loading factor.

49. The apparatus of claim 40 wherein the processor arrangement is further responsive:

to determine a transmit loading factor for each transmitter of a plurality of primary station transmitters to form a plurality of transmit loading factors;

when the plurality of transmit loading factors indicate initialization of the communication system, to sequentially assign a receiver of each secondary station of the plurality of secondary stations to each transmitter of the plurality of primary station transmitters; and when the plurality of transmit loading factors do not indicate initialization of the communication system, to assign a receiver of an entering secondary station of the plurality of secondary stations to a transmitter of the plurality of primary station transmitters then having a lowest transmit loading factor.

50. The apparatus of claim 40 wherein the processor arrangement is further responsive:

to determine a receive loading factor for each receiver of a plurality of primary station receivers to form a plurality of receive loading factors;

when a variation of the plurality of receive loading factors exceeds a threshold, to select a first receiver of the plurality of primary station receivers then having a highest receive loading factor;

for the first receiver, to determine an impact level of a transfer for each corresponding secondary station transmitter of the plurality of secondary stations and selecting a secondary station transmitter of the plurality of secondary stations then having a highest impact level to form a selected transmitter;

to select a second receiver of the plurality of primary station receivers then having a receive loading factor less than a mean receive loading factor and to determine a second receive loading factor for the second receiver in conjunction with the selected transmitter; and when the second receive loading factor is less than the mean receive loading factor, to transfer the selected transmitter to the second receiver.

51. The apparatus of claim 50, wherein the processor arrangement is further responsive:

to determine whether communication system historical information precludes a potential transfer of the selected transmitter; and when communication system historical information precludes the potential transfer of the selected transmitter, to select a secondary station transmitter of the plurality of secondary stations then having a next highest impact level to form the selected transmitter.

52. The apparatus of claim 50, wherein the processor arrangement is further responsive to:

to determine whether communication system protocol information precludes a potential transfer of the selected transmitter; and when communication system protocol information precludes the potential transfer of the selected transmitter, to select a secondary station transmitter of the plurality of secondary stations then having a next highest impact level to form the selected transmitter.

53. The apparatus of claim 50 wherein the threshold is predetermined.

54. The apparatus of claim 50 wherein the threshold is adaptive.

55. The apparatus of claim 50 wherein the receive loading factor further comprises a weighted combination of a packet rate, a bit rate, and a cycle time.

56. The apparatus of claim 40 wherein the processor arrangement is further responsive:

to determine a transmit loading factor for each transmitter of a plurality of primary station transmitters to form a plurality of transmit loading factors;

when a variation of the plurality of transmit loading factors exceeds a threshold, to select a first transmitter of the plurality of primary station transmitters then having a highest transmit loading factor;

for the first transmitter, to determine an impact level of a transfer for each corresponding secondary station receiver of the plurality of secondary stations and to select the secondary station receiver of the plurality of secondary stations then having a highest impact level to form a selected receiver;

to select a second transmitter of the plurality of primary station transmitters then having a transmit loading factor less than a mean transmit loading factor and to determine a second transmit loading factor for the selected transmitter in conjunction with the second receiver; and when the second transmit loading factor is less than the mean transmit loading factor, to transfer the selected receiver to the second transmitter.

57. The apparatus of claim 56, wherein the processor arrangement is further responsive:

to determine whether communication system historical information precludes a potential transfer of the selected receiver; and when communication system historical information precludes the potential transfer of the selected receiver, to select a secondary station receiver of the plurality of secondary stations then having a next highest impact level to form the selected receiver.

58. The apparatus of claim 56, wherein the processor arrangement is further responsive:

to determine whether communication system protocol information precludes a potential transfer of the selected receiver; and when communication system protocol information precludes the potential transfer of the selected receiver, to select a secondary station receiver of the plurality of secondary stations then having a next highest impact level to form the selected receiver.

59. The apparatus of claim 56 wherein the threshold is predetermined.

60. The apparatus of claim 56 wherein the threshold is adaptive.

61. The apparatus of claim 56 wherein the transmit loading factor further comprises a weighted combination of a packet rate, a bit rate, and a queue depth.

62. The apparatus of claim 40 wherein the processor arrangement is further responsive:

to determine a congestion parameter for each receiver of a plurality of primary station receivers to form a plurality of congestion parameters;

when a congestion parameter of the plurality of congestion parameters exceeds a first threshold, to select a first receiver of the plurality of primary station receivers then having a highest congestion parameter;

for the first receiver, to determine an impact level of a transfer for each corresponding secondary station transmitter of the plurality of secondary stations and to select a secondary station transmitter of the plurality of secondary stations then having a highest impact level to form a selected transmitter;

to select a second receiver of the plurality of primary station receivers then having a congestion parameter less than the first threshold and to determine a second congestion parameter for the second receiver in conjunction with the selected transmitter; and when the second congestion parameter is less than the first threshold, to transfer the selected transmitter to the second receiver.

63. The apparatus of claim 62, wherein the processor arrangement is further responsive:

to determine whether communication system historical information precludes a potential transfer of the selected transmitter; and when communication system historical information precludes the potential transfer of the selected transmitter, to select a secondary station transmitter of the plurality of secondary stations then having a next highest impact level to form the selected transmitter.

64. The apparatus of claim 62, wherein the processor arrangement is further responsive:

to determine whether communication system protocol information precludes a potential transfer of the selected transmitter; and when communication system protocol information precludes the potential transfer of the selected transmitter, to select a secondary station transmitter of the plurality of secondary stations then having a next highest impact level to form the selected transmitter.

65. The apparatus of claim 62, wherein the processor arrangement is further responsive, until the congestion parameter of the first receiver has decreased below a hysteresis threshold, to repeatedly:
   determine an impact level of a transfer for each corresponding secondary station transmitter of the plurality of secondary stations and to select a secondary station transmitter of the plurality of secondary stations then having a highest impact level to form a selected transmitter;
   select a second receiver of the plurality of primary station receivers then having a congestion parameter less than the first threshold and determine a second congestion parameter for the second receiver in conjunction with the selected transmitter; and
   when the second congestion parameter is less than the first threshold, transfer the selected transmitter to the second receiver.

66. The apparatus of claim 65 wherein the first threshold and the hysteresis threshold are predetermined.

67. The apparatus of claim 65 wherein the first threshold and the hysteresis threshold are adaptive.

68. The apparatus of claim 62 wherein the congestion parameter is an access latency factor.

69. The apparatus of claim 40 wherein the processor arrangement is further responsive:
   to determine a congestion parameter for each transmitter of a plurality of primary station transmitters to form a plurality of congestion parameters;
   when a congestion parameter of the plurality of congestion parameters exceeds a first threshold, to select a first transmitter of the plurality of primary station transmitters then having a highest congestion parameter;
   for the first transmitter, to determine an impact level of a transfer for each corresponding secondary station receiver of the plurality of secondary stations and to select a secondary station receiver of the plurality of secondary stations then having a highest impact level to form a selected receiver;
   to select a second transmitter of the plurality of primary station transmitters then having a congestion parameter less than the first threshold and to determine a second congestion parameter for the second transmitter in conjunction with the selected receiver; and
   when the second congestion parameter is less than first threshold, to transfer the selected receiver to the second transmitter.

70. The apparatus of claim 69, wherein the processor arrangement is further responsive:
   to determine whether communication system historical information precludes a potential transfer of the selected receiver; and
   when communication system historical information precludes the potential transfer of the selected receiver, to select a secondary station receiver of the plurality of secondary stations then having a next highest impact level to form the selected receiver.

71. The apparatus of claim 69, wherein the processor arrangement is further responsive:
   to determine whether communication system protocol information precludes a potential transfer of the selected receiver; and
   when communication system protocol information precludes the potential transfer of the selected receiver, to select a secondary station receiver of the plurality of secondary stations then having a next highest impact level to form the selected receiver.

72. The apparatus of claim 69, wherein the processor arrangement is further responsive, until the congestion parameter of the first transmitter has decreased below a hysteresis threshold, to repeatedly:
   determine an impact level of a transfer for each corresponding secondary station receiver of the plurality of secondary stations and select the secondary station receiver of the plurality of secondary stations then having a highest impact level to form a selected receiver;
   select a second transmitter of the plurality of primary station transmitters then having a congestion parameter less than the first threshold and determine a second congestion parameter for the second transmitter in conjunction with the selected receiver; and
   when the second congestion parameter is less than first threshold, transfer the selected receiver to the second transmitter.

73. The apparatus of claim 72 wherein the first threshold and the hysteresis threshold are predetermined.

74. The apparatus of claim 72 wherein the first threshold and the hysteresis threshold are adaptive.

75. The apparatus of claim 69 wherein the congestion parameter further comprises a throughput factor.

76. The apparatus of claim 40 wherein the apparatus is embodied within a primary station.

77. The apparatus of claim 40, wherein the processor arrangement further comprises:
   a first processor coupled to the channel interface;
   a second processor coupled to the channel interface; and
   a master controller coupled to the first processor and to the second processor.

78. An apparatus for spectrum management in a communication system, the communication system having a communication medium, the communication medium having a plurality of downstream communication channels, the communication medium further having a plurality of upstream communication channels, the communication system further having a plurality of secondary stations coupleable to the communication medium, each secondary station of the plurality of secondary stations having a receiver and a transmitter, the apparatus comprising:
   a plurality of channel interfaces coupleable to the communication medium, each channel interface of the plurality of channel interfaces having a transmitter for signal transmission on a downstream communication channel of the plurality of downstream communication channels to form a plurality of primary station transmitters, and each channel interface of the plurality of channel interfaces further having a receiver for signal reception on an upstream communication channel of the plurality of upstream communication channels to form a plurality of primary station receivers;
   a plurality of processors coupled to the plurality of channel interfaces; and
   a master controller coupled to the plurality of processors, the master controller further having a memory, the master controller responsive through a set of program instructions stored in the memory:
      to allocate loading of the plurality of upstream communication channels for an entering secondary station of the plurality of secondary stations based upon a first receive loading factor of a plurality of receive loading factors, the plurality of receive loading factors including a cycle time factor;

to allocate loading of the plurality of downstream communication channels for the entering secondary station based upon a first transmit loading factor of a plurality of transmit loading factors, the plurality of transmit loading factor including a queue depth factor;

to allocate loading of the plurality of upstream communication channels for an active secondary station of the plurality of secondary stations based upon a second receive loading factor of the plurality of receive loading factors and based upon a variation of the plurality of receive loading factors;

to allocate loading of the plurality of downstream communication channels for the active secondary station based upon a second transmit loading factor of the plurality of transmit loading factors and based upon a variation of the plurality of transmit loading factors;

to allocate the plurality of upstream communication channels based upon a first error parameter of a plurality of error parameters and based upon a first channel noise parameter of a plurality of channel noise parameters;

to allocate the plurality of downstream communication channels based upon a second error parameter of the plurality of error parameters and based upon a number of secondary stations of the plurality of secondary stations having the second error parameter;

to allocate loading of the plurality of upstream communication channels based upon a first congestion parameter, the first congestion parameter including an access latency factor; and to allocate loading of the plurality of downstream communication channels based upon a second congestion parameter, the second congestion parameter including a throughput factor.

* * * * *